(12) United States Patent
Shinoda et al.

(10) Patent No.: US 10,965,151 B2
(45) Date of Patent: Mar. 30, 2021

(54) MOTOR DRIVE SYSTEM INCLUDING POWER STORAGE DEVICE

(71) Applicant: Fanuc Corporation, Yamanashi (JP)

(72) Inventors: Shougo Shinoda, Yamanashi (JP); Satoshi Ikai, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 0 days.

(21) Appl. No.: 16/282,918

(22) Filed: Feb. 22, 2019

(65) Prior Publication Data
US 2019/0267835 A1 Aug. 29, 2019

(30) Foreign Application Priority Data
Feb. 26, 2018 (JP) .............................. JP2018-032055

(51) Int. Cl.
| | | |
|---|---|---|
| *H02J 3/32* | (2006.01) | |
| *H02J 9/06* | (2006.01) | |
| *H02J 3/30* | (2006.01) | |
| *H02P 27/06* | (2006.01) | |
| *H02J 1/16* | (2006.01) | |
| *B60R 16/02* | (2006.01) | |
| *H02J 7/34* | (2006.01) | |

(52) U.S. Cl.
CPC .............. *H02J 9/062* (2013.01); *B60R 16/02* (2013.01); *H02J 1/16* (2013.01); *H02J 3/30* (2013.01); *H02J 3/32* (2013.01); *H02J 9/06* (2013.01); *H02P 27/06* (2013.01); *H02J 7/345* (2013.01)

(58) Field of Classification Search
CPC .......... B60R 16/03; B60R 16/02; H02J 9/062; H02J 3/30; H02J 3/32
USPC ...................................................... 307/9.1, 66
See application file for complete search history.

(56) References Cited

U.S. PATENT DOCUMENTS

| | | | | |
|---|---|---|---|---|
| 6,184,593 | B1 * | 2/2001 | Jungreis .................. | H02J 9/062 307/64 |
| 6,344,732 | B2 * | 2/2002 | Suzuki .................. | B60W 10/08 320/132 |
| 6,819,012 | B1 * | 11/2004 | Gabrys .................... | H02J 9/066 307/68 |
| 8,022,674 | B2 * | 9/2011 | Miura .................... | B60W 10/26 320/132 |
| 9,233,613 | B2 | 1/2016 | Kusumi | |

(Continued)

FOREIGN PATENT DOCUMENTS

| | | | | |
|---|---|---|---|---|
| JP | 2007259587 A | * | 10/2007 | ................ H02J 9/06 |
| JP | 2011126691 A | | 6/2011 | |

(Continued)

*Primary Examiner* — Adi Amrany
(74) *Attorney, Agent, or Firm* — RatnerPrestia

(57) ABSTRACT

A motor drive system includes a converter configured to convert power between AC power in a power source and DC power in a DC link, an inverter for drive configured to convert power between the DC power in the DC link and AC power serving as drive power or regenerative power for a servomotor for drive, a motor control unit for drive configured to control the servomotor for drive connected to the inverter for drive, a power storage device configured to store the DC power from the DC link or to supply the DC power to the DC link, and a base holding energy change unit configured to change a base holding energy defined as a reference value of a holding energy of the power storage device, in accordance with the holding energy of the power storage device.

7 Claims, 9 Drawing Sheets

(56) References Cited

U.S. PATENT DOCUMENTS

| | | | |
|---|---|---|---|
| 9,266,529 B2* | 2/2016 | Dufford | B60W 20/40 |
| 9,343,907 B2 | 5/2016 | Takahashi et al. | |
| 10,137,880 B2* | 11/2018 | Ogawa | B60W 20/14 |
| 10,564,620 B2* | 2/2020 | Ikai | G05B 19/404 |
| 2010/0305799 A1* | 12/2010 | Yamada | B60K 6/46 |
| | | | 701/22 |
| 2011/0221400 A1* | 9/2011 | Takizawa | H01M 10/48 |
| | | | 320/166 |
| 2013/0009576 A1 | 1/2013 | Iwashita et al. | |
| 2015/0134174 A1* | 5/2015 | Preece | H01M 10/44 |
| | | | 701/22 |
| 2015/0365037 A1 | 12/2015 | Watabu et al. | |
| 2016/0096521 A1* | 4/2016 | Jang | B60W 10/26 |
| | | | 701/22 |
| 2017/0005606 A1* | 1/2017 | Kuroki | H02M 1/00 |
| 2017/0355358 A1* | 12/2017 | Ogawa | B60L 50/16 |
| 2018/0134240 A1* | 5/2018 | Tahara | B60R 16/03 |
| 2018/0316275 A1* | 11/2018 | Yoshida | H02M 7/217 |
| 2019/0044361 A1* | 2/2019 | Namiki | H02J 7/1446 |
| 2019/0115759 A1* | 4/2019 | Shinoda | H02J 3/30 |
| 2019/0115858 A1* | 4/2019 | Shinoda | H02P 11/04 |
| 2019/0149073 A1* | 5/2019 | Shinoda | H02M 7/797 |
| | | | 363/13 |
| 2020/0052489 A1* | 2/2020 | Shinoda | H02P 3/18 |

FOREIGN PATENT DOCUMENTS

| | | | | |
|---|---|---|---|---|
| JP | 2012114994 A | * | 6/2012 | H02P 27/06 |
| JP | 2013-009524 A | | 1/2013 | |
| JP | 2013017305 A | | 1/2013 | |
| JP | 5340514 B1 | | 11/2013 | |
| JP | 5389302 B1 | | 1/2014 | |
| JP | 2016-046833 A | | 4/2016 | |
| WO | 2012169009 A1 | | 12/2012 | |
| WO | 2013128564 A1 | | 9/2013 | |

\* cited by examiner

MOTOR DRIVE SYSTEM INCLUDING POWER STORAGE DEVICE

CROSS-REFERENCE TO RELATED APPLICATIONS

This application is a new U.S. Patent Application that claims benefit of Japanese Patent Application No. 2018-032055, filed Feb. 26, 2018, the disclosure of this application is being incorporated herein by reference in its entirety for all purposes.

BACKGROUND OF THE INVENTION

1. Field of the Invention

The present invention relates to a motor drive system including a power storage device.

2. Description of the Related Art

In a motor drive system for driving a servomotor provided to machines including a machine tool, a robot, etc. (hereinafter referred to as "servomotor for drive"), AC power supplied from an AC power source is converted into DC power by a converter (rectifier), the DC power is output to a DC link, the DC power in the DC link is further converted into AC power by an inverter, and the AC power is used as power for driving the servomotor for drive provided for each drive axis. It is a common practice to provide one converter for a plurality of inverters to reduce the cost and the footprint of the motor drive system. In other words, a converter configured to convert AC power supplied from an AC power source into DC power is used as a power source unit common to a plurality of inverters for drive (servo-amplifiers for drive), and these inverters for drive generate AC power for driving each servomotor for drive, using DC power output from the power source unit.

In acceleration or deceleration control of the servomotor for drive by the motor drive system, a power peak occurs because the AC power source is requested to output or regenerate high AC power. Especially in a motor drive system including a plurality of inverters for drive, which are connected to one converter, the occurring power peak may be relatively high. Reducing the power peak is desirable, because the higher the power peak, the higher the power source capacity and the operational cost of the motor drive system, and the more power problems such as power failure and flickering are likely to occur in the power source.

To reduce the power peak, in one conventionally used method, a power storage device which can store DC power in a DC link connecting the converter to the inverters for drive in the motor drive system is provided, and energy consumed or regenerated by the servomotor for drive is exchanged as appropriate via the DC link. With this method, the power peak can be reduced because regenerative power generated from the servomotor for drive can be stored in the power storage device during deceleration of the servomotor for drive, or the stored power can be reused during acceleration of the servomotor for drive. In other words, the use of a power storage device which inputs and outputs power to and from the DC link allows coping with even an operation (acceleration and deceleration) of the servomotor for drive which involves a power consumption higher than the maximum output power of the power source unit. Examples of the power storage device include a capacitor power storage device and a flywheel power storage device.

As an example, a press machine causes a very high maximum power consumption upon a press operation and often poses a problem related to shortage of power source capacity. Under the circumstances, a motor drive system in a press machine includes a flywheel power storage device provided in a DC link and supplies power from the power storage device when the press machine consumes high power to allow driving of the press machine under a low-capacity power source. For example, when the servomotor for drive consumes low power, a servomotor for buffer coupled to a flywheel is rotated at a constant speed, and when the servomotor for drive consumes higher power due to, for example, its acceleration or deceleration, the rotational speed of the servomotor for buffer is lowered, power regeneration is performed via an inverter for buffer, and DC power for driving the servomotor for drive is supplied to the DC link. Hence, even for an acceleration and deceleration operation which consumes a power higher than a maximum amount of power conversion that is a maximum amount of power which can be converted by the converter, driving can be performed using regenerative power from a servomotor for buffer coupled to a flywheel having rotation energy.

As disclosed in, for example, Japanese Unexamined Patent Publication (Kokai) No. 2013-009524, a motor drive device is known to include an AC/DC converter which converts AC power from an AC power source into DC power, a DC/AC converter which converts DC power into AC power for driving a motor or converts AC power regenerated from the motor into DC power, a DC link unit which connects a DC side of the AC/DC converter to a DC side of the DC/AC converter and exchanges DC power, an energy storage unit, including at least one capacitor storage unit and at least one flywheel storage unit, which is connected to the DC link unit and stores the DC power from the DC link unit or supplies the DC power to the DC link unit, a motor control unit which performs control to allow the DC/AC converter to output a desired AC power, based on a motor operation command for issuing a command related to an operation of the motor, and an energy control unit which performs control to allow the energy storage unit to store the DC power from the DC link unit or supply the DC power to the DC link unit.

As disclosed in, for example, Japanese Unexamined Patent Publication (Kokai) No. 2016-046833, a system for controlling a servomotor for driving an axis of industrial machinery or a machine tool is known to include a plurality of first servomotors for driving axes, a plurality of converters which convert an AC voltage into a DC voltage, a plurality of first inverters which receive the DC voltage from the converters and convert the DC voltage into an AC voltage for driving the plurality of first servomotors or convert AC power regenerated from the first servomotors into DC power, second servomotors which rotate inertia, a plurality of second inverters which receive the DC voltage from the converters and convert the DC voltage into an AC voltage for driving the second servomotors or convert AC power regenerated from the second servomotors into DC power, and a servomotor controller which controls the plurality of first servomotors and the second servomotors, wherein the second servomotors are fewer in number than the plurality of second inverters, at least one of the second servomotors includes a plurality of independent windings, and at least some of the plurality of second inverters are connected to a plurality of independent windings provided in one second servomotor.

SUMMARY OF INVENTION

In a motor drive system in which a DC link that connects a converter and an inverter for drive is provided with a power storage device in order to reduce a power peak, when the energy stored in the power storage device runs short due to some factor, sufficient drive power is not supplied to servomotors for drive, and there is possibility that a motor control system and a machine tool including the motor control system accidentally makes an alarm stop. For example, when an unexpected high load acts on the servomotors for drive which are being driven, the servomotors for drive consume more power than normal. In such a case, since the energy stored in the power storage device is consumed more than originally planned, it is highly possible that subsequent driving of the servomotors for drive is not continued due to power shortage. In addition, when the energy stored in the power storage device is greater than needed, there is a possibility that degradation of the power storage device is promoted. For example, in the case of a flywheel power storage device, the servomotor for buffer for rotating the flywheel rotates at a higher speed as the rotation energy is greater, and, as a result, the vibration due to the rotation speed increases, and the degradation of the servomotor for buffer and the flywheel coupled to the servomotor for buffer is promoted. Besides, in the case of a capacitor power storage device, for instance, since the capacitor voltage becomes higher as the stored energy becomes greater, the load on the capacitor becomes greater and the degradation of the capacitor is promoted. Accordingly, in the motor drive system including the power storage device that is provided in order to reduce the power peak of power source equipment, there is a demand for a technique for keeping the energy stored in the power storage device at a proper amount.

According to one aspect of the present disclosure, a motor drive system includes a converter configured to convert power between AC power in a power source and DC power in a DC link, an inverter for drive configured to convert power between the DC power in the DC link and AC power serving as drive power or regenerative power for a servomotor for drive, a motor control unit for drive configured to control the servomotor for drive connected to the inverter for drive, a power storage device configured to store the DC power from the DC link or to supply the DC power to the DC link, and a base holding energy change unit configured to change a base holding energy defined as a reference value of a holding energy of the power storage device, in accordance with the holding energy of the power storage device.

BRIEF DESCRIPTION OF THE DRAWINGS

The present invention will be more clearly understood by referring to the following accompanying drawings.

DETAILED DESCRIPTION

Figure 1:
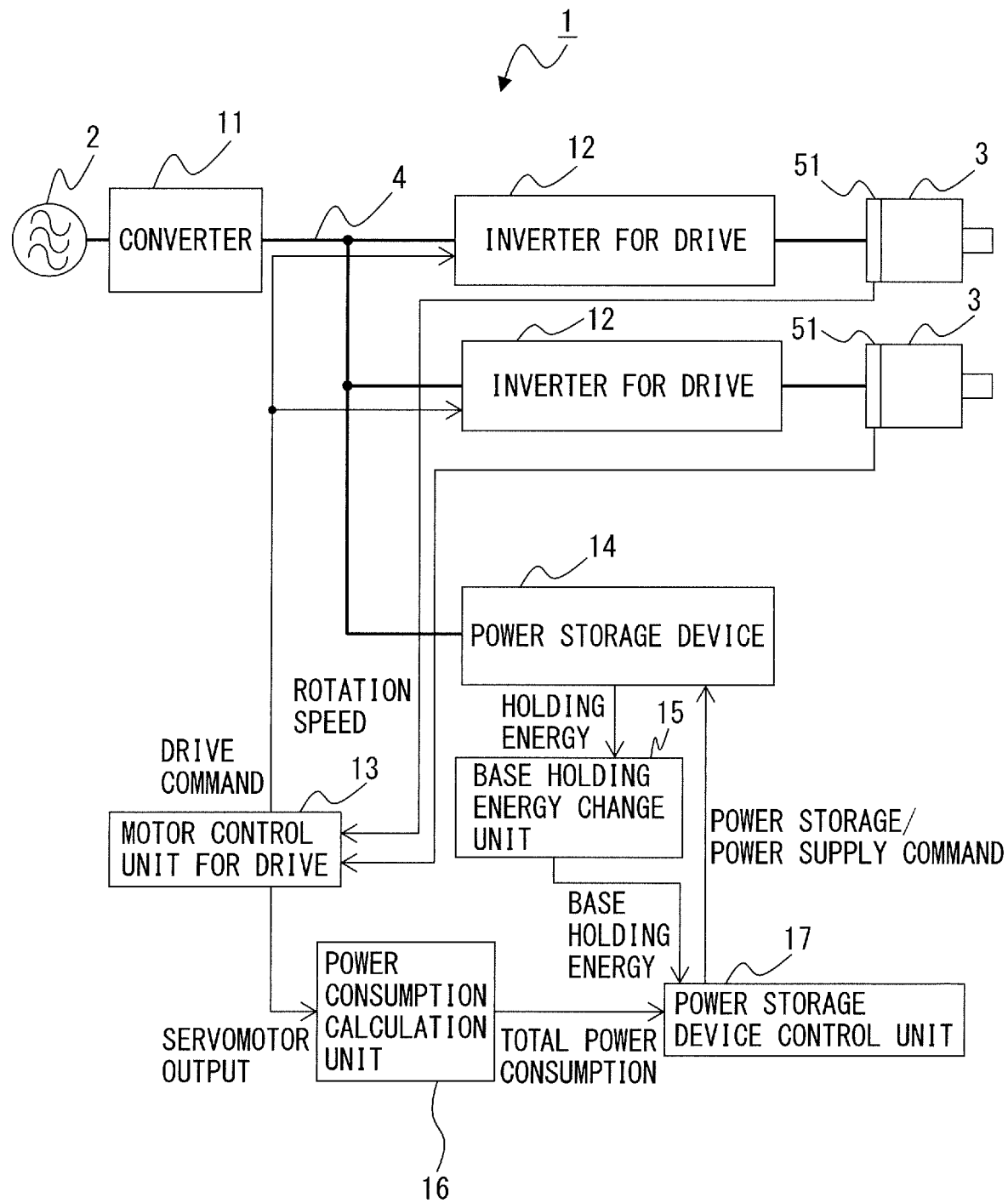
FIG. 1 is a block diagram illustrating a motor drive system according to one embodiment.

A motor drive system including a power storage device will be described below with reference to the drawings. The same reference numerals denote the same members throughout these drawings. These drawings use different scales as appropriate to facilitate an understanding. The mode illustrated in each drawing is one example for carrying out the present invention, and the present invention is not limited to the modes illustrated in these drawings. The "output of a servomotor for drive" includes the "power consumption of the servomotor for drive" and the "amount of regenerative power of the servomotor for drive," and the "output of a servomotor for buffer" includes the "power consumption of the servomotor for buffer" and the "amount of regenerative power of the servomotor for buffer." The rotation angular speeds of the servomotor for drive and the servomotor for buffer will be simply referred to as the "speeds" or the "rotation speeds" hereinafter.

A motor drive system according to an embodiment of the present disclosure is used for a system including servomotors for drive for driving drive axes in machines including a machine tool, a robot, etc., inverters for drive which supply AC power for driving the servomotors for drive in correspondence with the servomotors for drive, and a converter.

FIG. 1 is a block diagram illustrating a motor drive system according to one embodiment. The case where two servomotors for drive 3 are controlled by a motor drive system 1 connected to an AC power source 2 will be taken as an example herein. However, the number of servomotors for drive 3 does not particularly limit this embodiment and may be one, or three or more. The numbers of phases of the power source 2 and the servomotors for drive 3 do not particularly limit this embodiment, either, and a three- or single-phase configuration, for example, may be used. The type of servomotor for drive 3 does not particularly limit this embodiment, either, and an induction or synchronous motor, for example, may be used. Machines equipped with the servomotors for drive 3 include, for example, a machine tool, a robot, forging machinery, an injection molding machine, industrial machinery, various electrical appliances, an electric train, an automobile, and aircraft.

Each circuit component of the motor drive system 1 will be described first.

As illustrated in FIG. 1, the motor drive system 1 according to the embodiment includes a converter 11, inverters for drive 12, a motor control unit for drive 13, a power storage device 14, a base holding energy change unit 15, a power consumption calculation unit 16, and a power storage device control unit 17.

The converter 11 serves as a rectifier configured to convert power between AC power in the power source 2 and DC power in a DC link 4. The converter 11 is implemented in a three-phase bridge circuit when a three-phase alternating current is supplied from the power source 2, and in a single-phase bridge circuit when a single-phase alternating current is supplied from the power source 2. The converter 11 is implemented as a bidirectional AC/DC-convertible power converter, such as a 120-degree conduction rectifier circuit and a PWM switching control rectifier circuit, which converts AC power input from the power source 2 into DC power and outputs the DC power to the DC side, and converts the DC power of the DC link 4 into AC power and outputs the AC power to the power source 2 during power regeneration. When the converter 11 is implemented as, for example, a PWM switching control rectifier circuit, it is implemented in a bridge circuit of switching elements and diodes connected in antiparallel with the switching elements and performs bidirectional AC/DC power conversion by ON/OFF control of each switching element in accordance with a drive command received from a host controller (not illustrated). Examples of the switching element may include a unipolar transistor such as an FET, a bipolar transistor, an IGBT, a thyristor, and a GTO, but the type of switching element itself does not limit this embodiment, and other types of switching elements may be used.

For the converter 11, a "maximum amount of power conversion" is defined as a maximum amount of power which allows power conversion from AC power into DC power and a maximum amount of power which allows power conversion from DC power into AC power. The maximum amount of power conversion is generally defined as specification data associated with the conversion capacity of the converter 11 and is specified in, for example, a specification table or an instruction manual of the converter 11.

The inverters for drive 12 are connected to the converter 11 via the DC link 4. The DC link 4 includes a DC link capacitor (also called a smoothing capacitor), although not illustrated herein. The DC link capacitor has the functions of storing DC power in the DC link 4 and of suppressing pulsation of the DC output of the converter 11.

The inverter for drive 12 constitutes a servo-amplifier configured to convert the DC power in the DC link 4 into AC power and supplies the AC power to the servomotor for drive 3 as drive power, to drive the servomotor for drive 3. The inverter for drive 12 converts power between the DC power in the DC link 4 and the AC power serving as drive power or regenerative power for the servomotor for drive 3. The servomotor for drive 3 generally includes at least one winding, and one inverter for drive 12 may be preferably used per winding in the servomotor for drive 3, to drive the servomotor for drive 3. FIG. 1 represents servomotors for drive 3 of the single-winding type as an example, and accordingly, one inverter for drive 12 is connected to each servomotor for drive 3.

The inverter for drive 12 is implemented in a bridge circuit of switching elements and diodes connected in antiparallel with the switching elements, and ON/OFF control of each switching element is performed based on PWM switching control of, for example, the triangular wave comparison scheme. The inverter for drive 12 is implemented in a three-phase bridge circuit when the servomotor for drive 3 serves as a three-phase motor and in a single-phase bridge circuit when the servomotor for drive 3 serves as a single-phase motor. Examples of the switching element may include a unipolar transistor such as an FET, a bipolar transistor, an IGBT, a thyristor, and a GTO, but the type of switching element itself does not limit this embodiment, and other types of switching elements may be used.

The inverter for drive 12 converts power between the DC power of the DC link 4 and the AC power serving as drive power or regenerative power for the servomotor for drive 3 by ON/OFF control of each switching element based on a drive command received from the motor control unit for drive 13 (to be described later). More specifically, the inverter for drive 12 performs the switching operation of the internal switching elements, based on a drive command received from the motor control unit for drive 13, to convert DC power supplied from the converter 11 via the DC link 4 into AC power having a desired voltage and a desired frequency for driving the servomotor for drive 3 (inversion operation). The servomotor for drive 3 thus operates based on, for example, variable-voltage, variable-frequency AC power. Regenerative power may occur during deceleration of the servomotor for drive 3, but the switching operation of the internal switching elements is performed based on a drive command received from the motor control unit for drive 13, to convert the AC regenerative power occurring in the servomotor for drive 3 into DC power and return the DC power to the DC link 4 (rectification operation).

The motor control unit for drive 13 controls the servomotors for drive 3 connected to the inverters for drive 12 to operate (i.e., rotate) them in accordance with a predetermined operation pattern. The operation pattern of the servomotors for drive 3 is formed by combining acceleration, deceleration, constant-speed rotation, and a stop as appropriate in accordance with the operation details of the machine equipped with the servomotors for drive 3. A group of operations having the same details of the servomotors for drive 3 is defined as "one cycle," and the above-mentioned "operation pattern" is established by repeatedly executing this cycle. The operation pattern of the servomotors for drive 3 is defined by an operation program for the servomotors for drive 3. When, for example, the servomotors for drive 3 are provided in a machine tool, an operation program for the servomotors for drive 3 is defined as one of machining programs for the machine tool.

Since the servomotors for drive 3 are controlled in speed, torque, or rotor position, based on, for example, variable-voltage, variable-frequency AC power supplied from the inverters for drive 12, control of the servomotors for drive 3 by the motor control unit for drive 13 is eventually implemented by controlling the power conversion operation of the inverters for drive 12. In other words, the motor control unit for drive 13 controls the servomotors for drive 3 to operate them in accordance with a predetermined operation pattern, by controlling power conversion of the inverters for drive 12. More specifically, the following operation is performed: The motor control unit for drive 13 generates a drive command for controlling the speeds, the torques, or the rotor positions of the servomotors for drive 3, based on, for example, the (rotor) speeds (speed feedback) of the servomotors for drive 3 detected by a speed detector 51, a current flowing through the windings of the servomotors for drive 3 (current feedback), a predetermined torque command, and an operation program for the servomotors for drive 3. The power conversion operation by the inverters for drive 12 is controlled based on the drive command generated by the motor control unit for drive 13. The configuration of the motor control unit for drive 13 defined herein is merely illustrative, and the configuration of the motor control unit for drive 13 may be defined including terms such as a position command generation unit, a torque command generation unit, and a switching command generation unit.

To allow driving of the servomotors for drive 3 at an output higher than the maximum amount of power conversion of the converter 11, the motor drive system 1 includes a power storage device 14.

The power storage device 14 stores DC power from the DC link 4 (power storage) and supplies DC power to the DC link 4 (power supply). The power storage and power supply of the power storage device 14 are controlled by the power storage device control unit 17. Base holding energy is defined as a reference value (target value) of energy which is to be stored by the power storage device 14. By the control of the power storage device control unit 17, power is stored in the power storage device 14 so that the holding energy of the power storage device 14 may recover to the base holding energy that is the target value of the holding energy of the power storage device 14. For example, while the servomotors for drive 3 are not operating and the output/input of power by the power storage device 14 is not particularly needed, the holding energy of the power storage device 14 is kept at the base holding energy. When the power supply operation of the power storage device 14 is performed, the holding energy of the power storage device 14 lowers to a value less than the base holding energy, but when power storage of the power storage device 14 is performed, the holding energy of the power storage device 14 increases and recovers to the base holding energy as the target value. Depending on the driving condition of the servomotors for drive 3 by the motor drive system 1, power supply of the power storage device 14 may be performed before the holding energy of the power storage device 14 recovers to the base holding energy.

Figure 2:
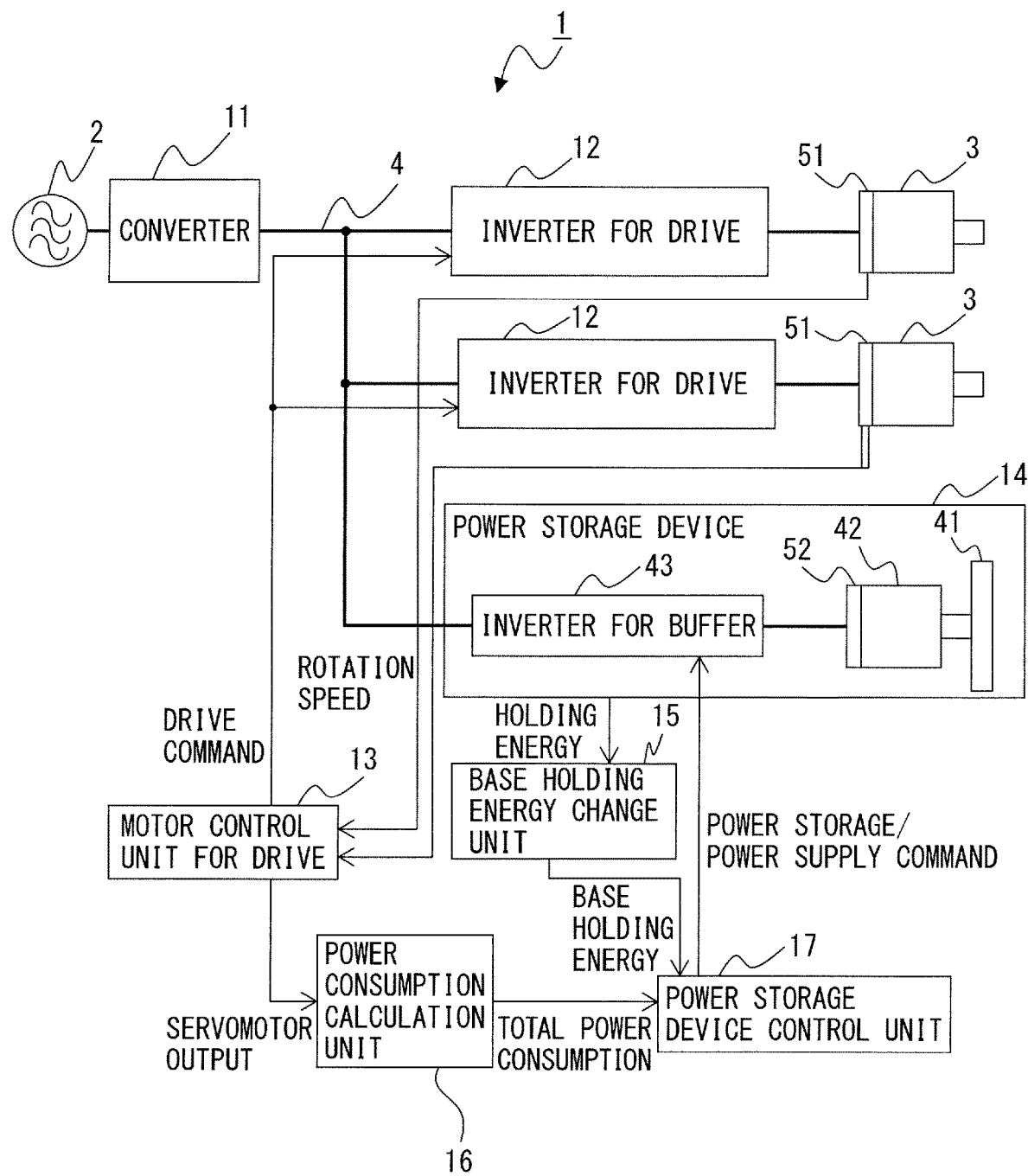
FIG. 2 is a block diagram illustrating the motor drive system according to the embodiment, which includes a flywheel power storage device.
Figure 3:
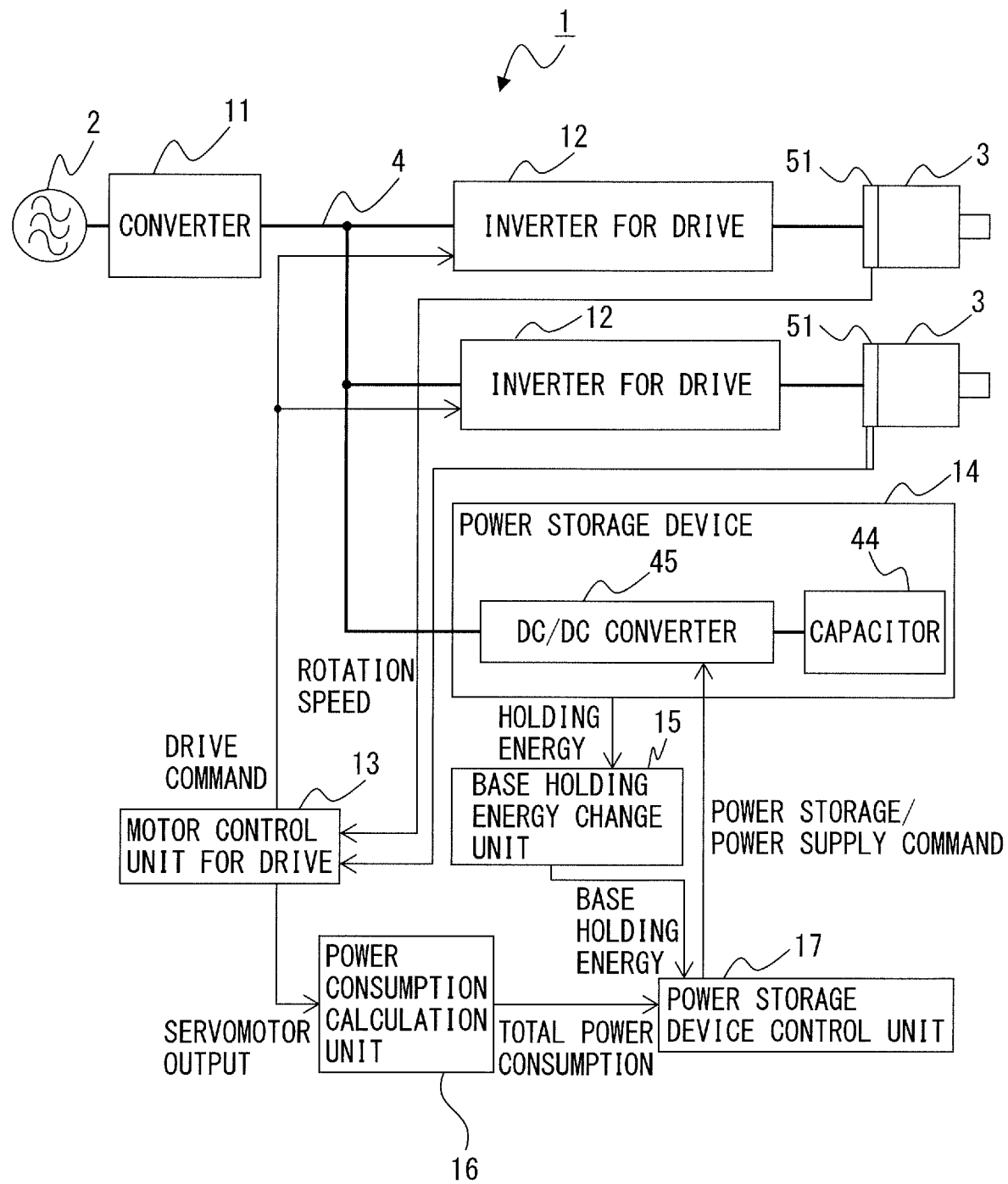
FIG. 3 is a block diagram illustrating the motor drive system according to the embodiment, which includes a capacitor power storage device.

Examples of the power storage device 14 include a flywheel power storage device as illustrated in FIG. 2 and a capacitor power storage device as illustrated in FIG. 3.

FIG. 2 is a block diagram illustrating the motor drive system according to the embodiment, which includes a flywheel power storage device. The flywheel power storage device 14 includes a flywheel 41, a servomotor for buffer 42, and an inverter for buffer 43.

The flywheel 41 can store rotation energy, which is also called inertia.

The servomotor for buffer 42 is used to rotate the flywheel 41, which is connected to the rotation shaft of the servomotor for buffer 42. Rotation energy can be stored in the flywheel 41 by rotating the servomotor for buffer 42. The number of phases of the servomotor for buffer 42 does not particularly limit this embodiment, and a three- or single-phase configuration, for example, may be used. A speed detector 52 is provided in the servomotor for buffer 42, and the (rotor) speed of the servomotor for buffer 42 detected by the speed detector 52 is used to control the power storage device 14 by the power storage device control unit 17.

The inverter for buffer 43 converts power between the DC power in the DC link 4 and the AC power serving as drive power or regenerative power for the servomotor for buffer 42 by ON/OFF control of each switching element, based on power storage and power supply commands received from the power storage device control unit 17. The inverter for buffer 43 is implemented in a bridge circuit of switching elements and diodes connected in antiparallel with the switching elements. The inverter for buffer 43 is implemented in a three-phase bridge circuit when the servomotor for buffer 42 serves as a three-phase motor and in a single-phase bridge circuit when the servomotor for buffer 42 serves as a single-phase motor. Examples of the switching element may include a unipolar transistor such as an FET, a bipolar transistor, an IGBT, a thyristor, and a GTO, but the type of switching element itself does not limit this embodiment, and other types of switching elements may be used. For example, ON/OFF control of each switching element in the inverter for buffer 43 is performed based on a PWM switching signal obtained by comparing the received drive command with a triangular carrier.

By controlling power conversion of the inverter for buffer 43 by the power storage device control unit 17, the servomotor for buffer 42 connected to the flywheel 41 rotates with acceleration or deceleration or rotates at a constant speed, so that the amount of DC power to be stored or supplied by the power storage device 14 (the amount of DC power to be input to or output from the DC link 4 by the power storage device 14) is adjusted. More specifically, the following operation is performed.

In power storage of the power storage device 14, the inverter for buffer 43 performs an inversion operation for converting the DC power in the DC link 4 into AC power, based on a power storage command received from the power storage device control unit 17. Hence, electrical energy from the DC link 4 is fed to the servomotor for buffer 42 and acts to rotate the servomotor for buffer 42 connected to the flywheel 41. In this manner, in the flywheel power storage device 14, electrical energy flowing from the DC link 4 into the power storage device 14 is converted into rotation energy of the flywheel 41 and stored.

In power supply of the power storage device 14, the inverter for buffer 43 performs a rectification operation for converting AC regenerative power into DC power by generating the AC regenerative power upon decelerating the servomotor for buffer 42 connected to the flywheel 41, based on a power supply command received from the power storage device control unit 17. Hence, rotation energy stored in the flywheel 41 is converted into electrical energy and supplied to the DC link 4.

In the flywheel power storage device 14 illustrated in FIG. 2, the output of the servomotor for buffer 42, for example, corresponds to the holding energy of the power storage device 14. The holding energy of the power storage device 14 that is the output of the servomotor for buffer 42 can be calculated, for example, based on the following equation (1):

$$\text{Holding Energy of Power Storage Device } 14 = (\tfrac{1}{2}) \times J \times \omega^2 \quad (1)$$

where $\omega$ is the rotation speed (angular speed) of the servomotor for buffer 42 detected by the speed detector 52, and $J$ is the moment of inertia of the servomotor for buffer 42.

As is obvious from equation (1), since the holding energy of the power storage device 14 is proportional to the square of the rotation speed of the servomotor for buffer 42, the rotation speed (or its square) of the servomotor for buffer 42 may be used as a parameter representing the holding energy of the power storage device 14.

FIG. 3 is a block diagram illustrating the motor drive system according to the embodiment, which includes a capacitor power storage device. The capacitor power storage device 14 includes a capacitor 44 and a DC/DC converter 45 configured to convert power between the DC power in the DC link 4 and the DC power stored in the capacitor 44.

Examples of the DC/DC converter 45 include a DC/DC boost and buck chopper circuit. The amount of DC power to be stored or supplied by the power storage device 14 (the amount of DC power to be input to or output from the DC link 4 by the power storage device 14) is adjusted by controlling the boosting and bucking operations of the DC/DC converter 45 by the power storage device control unit 17. More specifically, the following operation is performed.

In power storage of the power storage device 14, the DC/DC converter 45 is controlled to set the DC voltage on the capacitor 44 lower than the DC voltage on the DC link 4 by the power storage device control unit 17, based on a power storage command received from the power storage device control unit 17. Hence, electrical energy flows from the DC link 4 into the capacitor 44, and power storage of the power storage device 14 is performed.

In power supply of the power storage device 14, the DC/DC converter 45 is controlled to set the DC voltage on the capacitor 44 higher than the DC voltage on the DC link 4 by the power storage device control unit 17, based on a power supply command received from the power storage device control unit 17. Hence, electrical energy flows from the capacitor 44 into the DC link 4, and power supply of the power storage device 14 is performed.

In the capacitor power storage device 14 illustrated in FIG. 3, the amount of DC power stored in the capacitor 44, for example, corresponds to the holding energy of the power storage device 14. The holding energy of the power storage device 14 can be calculated, for example, based on the following equation (2):

$$\text{Holding Energy of Power Storage Device } 14 = (\tfrac{1}{2}) \times C \times V^2 \qquad (2)$$

where C is the capacitance of the capacitor 44, and V is the voltage of the capacitor 44.

As is obvious from equation (2), since the holding energy of the power storage device 14 is proportional to the square of the voltage of the capacitor 44, the voltage (or its square) of the capacitor 44 may be used as a parameter representing the holding energy of the power storage device 14.

Figure 4:
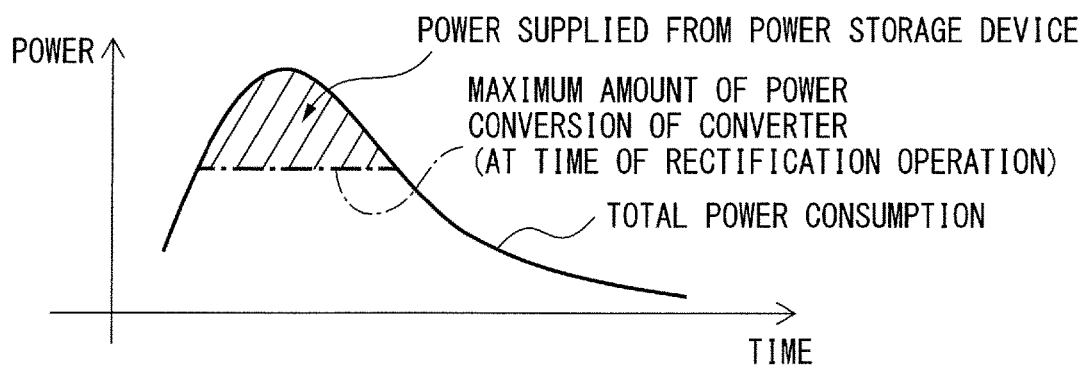
FIG. 4 is a graph illustrating an exemplary relationship between the DC power supplied from the power storage device in the motor drive system according to the embodiment and DC power supplied from a converter.

As the motor drive system 1 includes the power storage device 14 that performs the above-mentioned operations, energy stored in the power storage device 14 is supplied to the servomotors for drive 3, as well as energy supplied from the converter 11, and is used as power for accelerating the servomotors for drive 3, during acceleration of the servomotors for drive 3. FIG. 4 is a graph illustrating an exemplary relationship between the DC power supplied from the power storage device in the motor drive system according to the embodiment and the DC power supplied from the converter. Power supplied from the converter 11 to the DC link 4 is consumed not only as drive power for the servomotors for drive 3 (i.e., the outputs of the servomotors for drive 3 correspond to the drive power) but also as winding losses in the servomotors for drive 3, a loss in the converter 11, and losses in the inverters for drive 12. The sum of the powers consumed by the servomotors for drive 3, the inverters for drive 12, and the converter 11 will be referred to as a "total power consumption" hereinafter and is indicated by a solid line in FIG. 4. An alternate long and short dashed line indicates the maximum amount of power conversion in the rectification operation of the converter 11. As illustrated in FIG. 4, the amount (a hatched area in FIG. 4) by which the maximum supplied power of the converter 11 is exceeded in the total power consumption is compensated for by DC power supplied from the power storage device 14 to the DC link 4.

In the motor drive system 1, during deceleration of the servomotors for drive 3, energy regenerated from the servomotors for drive 3 is stored in the power storage device 14. Since the energy stored in the power storage device 14 is used to drive the servomotors for drive 3, in conjunction with power supplied from the converter 11, the servomotors for drive 3 can be driven at an output higher than the maximum amount of power conversion of the converter 11, and the power peak can thus be reduced. Reducing the power peak can curb the power source capacity and the operational cost of the motor drive system 1 and can even prevent power failure and flickering in the power source 2.

Returning to the description of FIG. 1, the power consumption calculation unit 16 calculates a total power consumption obtained as the sum of the outputs of the servomotors for drive 3, the winding losses in the servomotors for drive 3, the loss in the converter 11, and the losses in the inverters for drive 12. The output of the servomotor for drive 3 is obtained by multiplying the rotation speed of the servomotor for drive 3 detected by the speed detector 51 and the torque of the servomotor for drive 3. When the servomotor for drive 3 accelerates, the servomotor for drive 3 consumes AC power supplied from the inverter for drive 12, and the output of the servomotor for drive 3 upon this power consumption is defined to be "positive." This means that when power is regenerated upon deceleration of the servomotor for drive 3, the output of the servomotor for drive 3 is "negative." Normally, since the winding loss in the servomotor for drive 3, the loss in the converter 11, and the loss in the inverter for drive 12 are lower than the absolute value of the output of the servomotor for drive 3, the output of the servomotor for drive 3 has a dominant influence on the total power consumption. Accordingly, the positive or negative sign (consumption or regeneration) of the output of the servomotor for drive 3 nearly corresponds to the positive or negative sign of the total power consumption.

Since the inverter for buffer 43 and the DC/DC converter 45 also have losses, the power consumption calculation unit 16 may calculate as a total power consumption, a sum obtained by further adding the loss in the inverter for buffer 43 or the DC/DC converter 45 to the sum of the outputs of the servomotors for drive 3, the winding losses in the servomotors for drive 3, the loss in the converter 11, and the losses in the inverters for drive 12.

The power storage device control unit 17 controls power storage and power supply of the power storage device 14 by controlling the power conversion operation of the inverter for buffer 43 in the power storage device 14, which is implemented as the flywheel power storage device 14 illustrated in FIG. 2. The power storage device control unit 17 controls power storage and power supply of the power storage device 14 by controlling the boosting and bucking operations of the DC/DC converter 45 in the power storage device 14, which is implemented as the capacitor power storage device 14 illustrated in FIG. 3.

The power storage device control unit 17 compares the total power consumption and a threshold for supply, and, when the power storage device control unit 17 determines, as a result of the comparison, that the total power consumption is higher than the threshold for supply, the power storage device control unit 17 controls the power storage device 14 to supply DC power to the DC link 4. In addition, the power storage device control unit 17 compares the total power consumption and a threshold for power storage, and, when the power storage device control unit 17 determines, as a result of the comparison, that the total power consumption is lower than the threshold for power storage, the power storage device control unit 17 controls the power storage device 14 to store DC power from the DC link 4 so that the holding energy of the power storage device 14 recovers to the base holding energy.

The threshold for supply may be set based on the maximum amount of power conversion for the rectification operation of the converter 11. For example, when the difference between the maximum amount of power conversion and the total power consumption calculated by the power consumption calculation unit 16 for the rectification operation of the converter 11 is negative, since the total power consumption is greater than the maximum supplied power in rectification of the converter 11, i.e., energy fed from the power source 2 to the DC link 4 by the converter 11 is insufficient to cover the overall total power consumption, the power shortage may be preferably compensated for by DC power supplied from the power storage device 14 to the DC link 4. The threshold for supply is set as a reference value for judging whether the present state is a state in which DC power is to be supplied from the power storage device 14 to the DC link 4, since the total power consumption is higher than the maximum supplied power in rectification of the converter 11.

The threshold for power storage may be set based on the maximum amount of power conversion for the inversion operation of the converter 11. For example, when the difference between the absolute value of the maximum amount of power conversion and the absolute value of the total power consumption calculated by the power consumption calculation unit 16 for the inversion operation of the converter 11 is negative, since the total power consumption is greater than the maximum regenerative power in inversion of the converter 11, the excess power may be preferably stored in the power storage device 14. The threshold for power storage is set as a reference value for judging whether the present state is a state in which DC power from the DC link 4 is to be stored in the power storage device 14, since the total power consumption is higher than the maximum supplied power in inversion of the converter 11.

The operation of the power storage device control unit 17 will be described below in greater detail.

The power storage device control unit 17 compares the total power consumption calculated by the power consumption calculation unit 16 and the threshold for supply, and when the power storage device control unit 17 determines that the total power consumption is higher than the threshold for supply, the power storage device control unit 17 calculates, for example, the difference between the total power consumption and the threshold for supply as "power supply amount" which is the amount of DC power that is to be supplied to the DC link 4 by the power storage device 14. The power storage device control unit 17 outputs to the power storage device 14 a power supply command to execute control to supply DC power corresponding to the supply power amount to the DC link 4.

The power storage device control unit 17 compares the total power consumption calculated by the power consumption calculation unit 16 and the threshold for power storage, and when the power storage device control unit 17 determines that the total power consumption is lower than the threshold for power storage, the power storage device control unit 17 calculates, for example, the difference between the threshold for power storage and the total power consumption as "power storage amount" which is the amount of DC power that is to be stored in the power storage device 14 from the DC link 4. The power storage device control unit 17 outputs to the power storage device 14 a power storage command to execute control to store DC power corresponding to the power storage amount from the DC link 4, so that the holding energy of the power storage device 14 recovers to the base holding energy. Depending on the driving condition of the servomotors for drive 3 by the motor drive system 1, the power supply command may be output from the power storage device control unit 17 to the power storage device 14 before the holding energy of the power storage device 14 recovers to the base holding energy.

The power storage device 14 performs power supply upon receiving the power supply command from the power storage device control unit 17, and performs power storage upon receiving the power storage command from the power storage device control unit 17.

Figure 5:
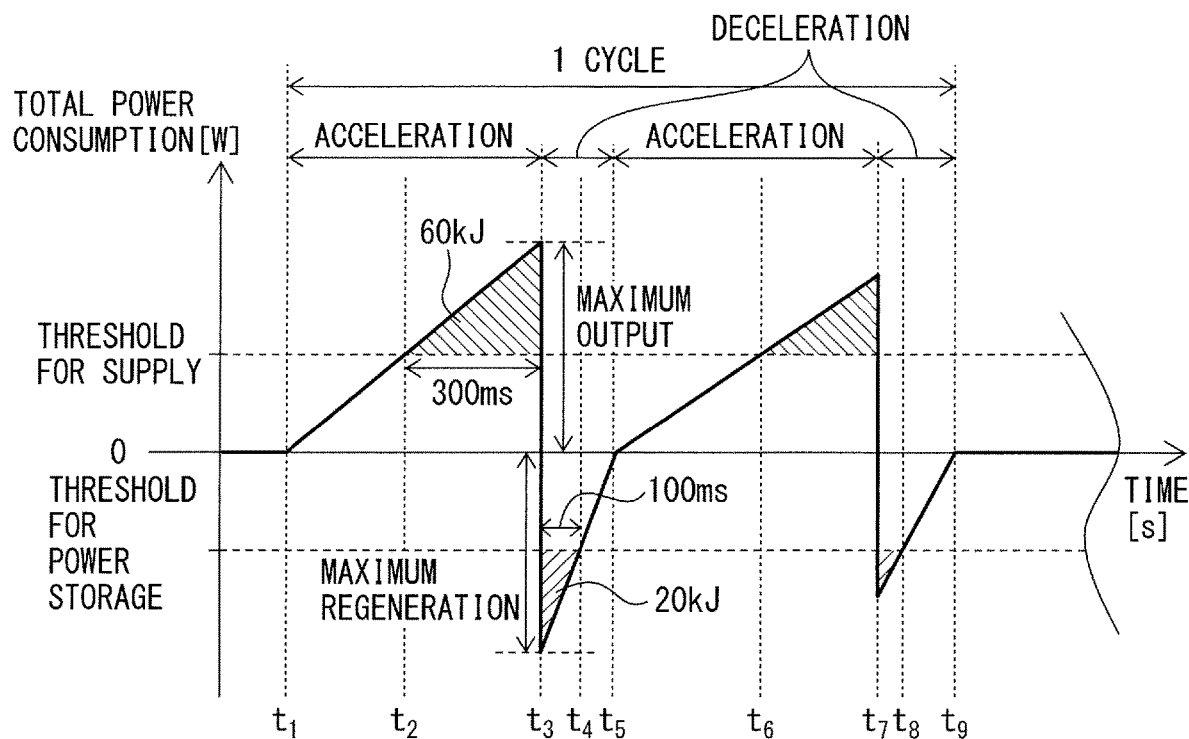
FIG. 5 is a timing chart illustrating an example of control of the power storage device by a power storage device control unit.

FIG. 5 is a timing chart illustrating an example of control of the power storage device by the power storage device control unit. As an example, in an operation pattern of one cycle of the servomotors for drive 3 which are driven by the motor drive system 1, time $t_1$ to time $t_3$ are defined as acceleration, time $t_3$ to time $t_5$ are defined as deceleration, time $t_5$ to time $t_7$ are defined as acceleration, and time $t_7$ to time $t_9$ are defined as deceleration. When the servomotors for drive 3 are accelerated by the motor drive system 1 during time $t_1$ to time $t_3$, the total power consumption gradually increases. When the total power consumption becomes higher than the threshold for supply at time $t_2$, the power storage device control unit 17 controls the power storage device 14 to supply DC power to the DC link 4. When the servomotors for drive 3 are decelerated by the motor drive system 1 during time $t_3$ to time $t_5$, the servomotors for drive 3 perform regeneration and the total power consumption becomes negative. During time $t_3$ to time $t_4$, since the total power consumption is lower than the threshold for power storage, the power storage device control unit 17 controls the power storage device 14 to store DC power from the DC link 4. When the servomotors for drive 3 are accelerated by the motor drive system 1 during time $t_5$ to time $t_7$, the total power consumption gradually increases. When the total power consumption becomes higher than the threshold for supply at time $t_6$, the power storage device control unit 17 controls the power storage device 14 to supply DC power to the DC link 4. When the servomotors for drive 3 are decelerated by the motor drive system 1 during time $t_7$ to time $t_9$, the servomotors for drive 3 perform regeneration and the total power consumption becomes negative. During time $t_7$ to time $t_8$, since the total power consumption is lower than the threshold for power storage, the power storage device control unit 17 controls the power storage device 14 to store DC power from the DC link 4.

The selection of the power storage device 14 will now be described by taking an example. In FIG. 5, for example, when the maximum amount of power conversion (maximum output) for rectification of the converter 11 is 1000 [kW], the maximum amount of power conversion (maximum regeneration) for inversion of the converter 11 is 1000 [kW], the threshold for supply is 600 [kW] and the threshold for power storage is −600 [kW], the base holding energy is set, for example, as follows. In FIG. 5, time $t_2$ to time $t_3$, during which the total power consumption is higher than the threshold for supply, are, for example 300 [ms], and time $t_3$ to time $t_4$, during which the total power consumption is lower than the threshold for power storage, are, for example 100 [ms].

The amount of energy, which is to be supplied by the power storage device 14 during time $t_2$ to time $t_3$, is expressed by the following equation (3):

$$\text{Supply Energy Amount} = (1000-600)\,[\text{kW}] \times 0.3\,[\text{s}] \div 2 = 60\,[\text{kJ}] \quad (3)$$

The amount of energy, which is to be stored in the power storage device 14 during time $t_3$ to time $t_4$, is expressed by the following equation: (4)

$$\text{Energy Storage Amount} = (1000-600) \,[\text{kW}] \times 0.1 \,[\text{s}] \div 2 = 20 \,[\text{kJ}] \quad (4)$$

From equation (3), it is understood that the power storage device 14 may preferably supply energy of 60 [kJ] at maximum, but the base holding energy of power storage device 14 is set to 70 [kJ] (=60 [kJ]+10 [kJ]) with an allowance of, for example 10 [kJ] for the purpose of safety. The power storage device 14 with the base holding energy of 70 [kJ] needs to store energy of 20 [kJ] at maximum, as indicated by equation (4). Hence, with the allowance of, for example 10 [kJ] for the purpose of safety, the power storage device 14 having the maximum storage capacity of 100 [kJ] (=70 [kJ]+20 [kJ]+10 [kJ]) may be selected.

For example, in the case of the flywheel power storage device 14, when the inertia of the servomotor for buffer 42 is 1 [kg·m²], the rotation speed of the servomotor for buffer 42 for obtaining base holding energy of 70 [kH] is expressed by the following equation (5):

$$\sqrt{(70\,[\text{kJ}] \div 1\,[\text{kg·m}^2] \div 2)} = 187.1\,[\text{rad/s}] = 1786.7\,[\text{min}^{-1}] \quad (5)$$

The rotation speed, which the servomotor for buffer 42 needs to have in order to construct the flywheel power storage device 14 with the maximum storage capacity of 100 [kJ], is expressed by the following equation (6):

$$\sqrt{(100\,[\text{kJ}] \div 1\,[\text{kg·m}^2] \div 2)} = 223.6\,[\text{rad/s}] = 2135.2\,[\text{min}^{-1}] \quad (6)$$

From equation (5) and equation (6), the servomotor for buffer 42, which has a base rotation speed (corresponding to the base holding energy) of 2000 [min$^{-1}$] and the maximum rotation speed of 3000 [min$^{-1}$], may be selected, for example, for the flywheel power storage device 14 which has the base holding energy of 70 [kJ] and the maximum storage capacity of 100 [kJ].

The numerical values mentioned in the description relating to the above-described selection of the power storage device 14 are merely examples, and the numerical values are properly set in accordance with, for example the purpose of use to which the motor drive system 1 is applied.

Returning to the description of FIG. 1, the base holding energy change unit 15 changes the base holding energy which is defined as a reference value of holding energy of the power storage device 14, in accordance with the holding energy of the power storage device 14.

The holding energy of the power storage device 14 can be calculated, for example, according to equation (1) for the flywheel power storage device 14 illustrated in FIG. 2, and according to equation (2) for the capacitor power storage device 14 illustrated in FIG. 3. In this case, the calculation process of the holding energy of the power storage device 14 may be executed by the base holding energy change unit 15, or may be executed by the power storage device control unit 17, or may be executed by a calculation process unit (not illustrated) which is separately provided. For example, since the power storage device control unit 17 calculates the "power storage amount" which is the amount of DC power that is to be stored in the power storage device 14 from the DC link 4, or the "power supply amount" which is the amount of DC power that is to be supplied to the DC link 4 by the power storage device 14, the power storage device control unit 17 may calculate the holding energy of the power storage device 14, based on the amount of energy obtained by integrating the "power storage amount" or "power supply amount". In this case, the calculation process of the holding energy of the power storage device 14 is executed by the power storage device control unit 17, and the calculation result is sent to the base holding energy change unit 15.

A base holding energy change process by the base holding energy change unit 15 is executed, for example, in three modes as described below.

A base holding energy change process by a first mode increases the base holding energy when the holding energy of the power storage device 14 runs short. According to the first mode, the base holding energy change unit 15 compares a minimum value of the holding energy of the power storage device 14 in a predetermined period and a threshold for energy shortage determination defined in advance, and when the base holding energy change unit 15 determines, as a result of the comparison, that the minimum value of the holding energy of the power storage device 14 is lower than the threshold for energy shortage determination, the base holding energy change unit 15 sets, as a new base holding energy after a change, a value calculated by adding a value, which is equal to or greater than a difference between the threshold for energy shortage determination and the minimum value of the holding energy of the power storage device 14, to the base holding energy before the change. A group of operations having the same details of the servomotors for drive 3 is defined as "one cycle", and the one cycle is defined as the above-described "predetermined period". Two or more cycles may be defined as the "predetermined period". The threshold for energy shortage determination may be set to, for example a value greater than zero. For instance, the threshold for energy shortage determination is set to, for example about 10% of the maximum storage capacity of the power storage device 14. The numerical value mentioned here of the threshold for energy shortage determination is merely an example, and the numerical value of the threshold for energy shortage determination can be set to an optionally selected value in accordance with, for example the purpose of use to which the motor drive system is applied.

Figure 6:
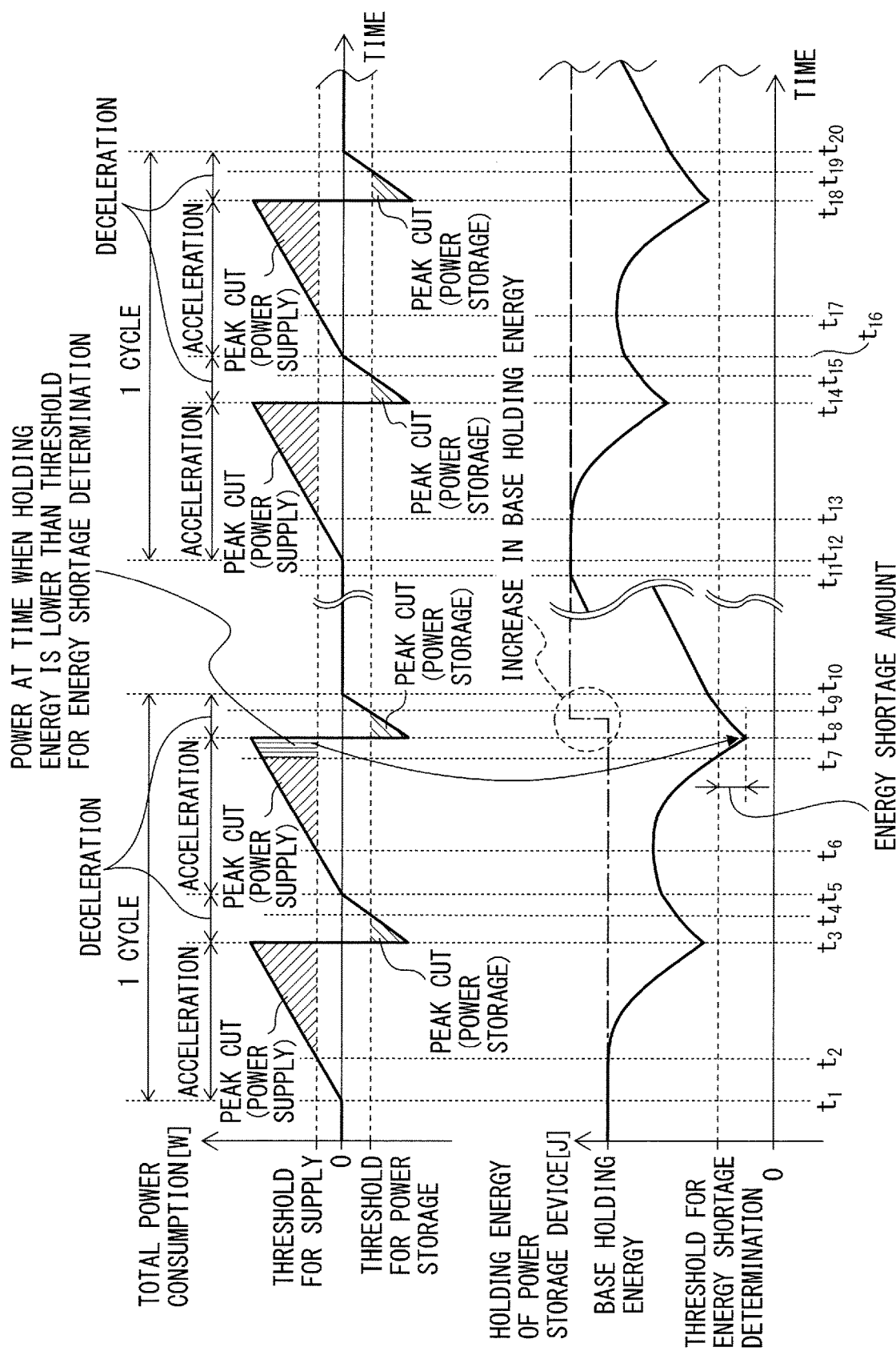
FIG. 6 is a timing chart illustrating an exemplary relationship between the total power consumption and the holding energy of the power storage device, when a base holding energy change process according to a first mode is executed in the motor drive system according to the embodiment.

FIG. 6 is a timing chart illustrating an exemplary relationship between the total power consumption and the holding energy of the power storage device, when the base holding energy change process according to the first mode is executed in the motor drive system according to the embodiment. In FIG. 6, an upper part indicates a total power consumption calculated by the power consumption calculation unit 16, and a lower part indicates the holding energy of the power storage device 14. An example is now assumed in which the holding energy of the power storage device 14 may run short during time $t_7$ to time $t_9$, when the servomotors for drive 3 are accelerated and decelerated by the motor drive system 1 and the total power consumption varies as illustrated in the upper part of FIG. 6. The "acceleration, deceleration, acceleration, deceleration" of the servomotors for drive 3 is defined as one cycle. In FIG. 6, for example, the "acceleration, deceleration, acceleration, deceleration" from time $t_1$ to time $t_{10}$ is one cycle, and the "acceleration, deceleration, acceleration, deceleration" from time $t_{12}$ to time $t_{20}$ is one cycle. Since each cycle has the same operation pattern, each cycle normally has substantially the same total power consumption. A standby process period for recovering the holding energy of the power storage device 14 to the base holding energy is provided between a preceding cycle and a subsequent cycle. In the standby process period, DC power, into which AC power from the power source 2 is converted by the converter 11, is stored in the power storage device 14, and the holding energy of the power storage device 14 gradually increases. In the example of FIG. 6, the standby process period ends at time $t_{11}$ since the holding energy of the power storage device 14 recovers to the base holding energy, and the next cycle is started at time $t_{12}$. Although the operation of the servomotor for drive 3 in one cycle is defined as "acceleration, deceleration, acceleration, deceleration" by way of example, one cycle may be defined with inclusion of constant-speed rotation, a stop, or the like.

Until time $t_1$, the holding energy of the power storage device 14 is kept at the base holding energy. During time $t_1$ to time $t_3$, when the servomotors for drive 3 are accelerated by the motor drive system 1, the total power consumption gradually increases. When the total power consumption becomes higher than the threshold for supply at time $t_2$, the power storage device control unit 17 controls the power storage device 14 to supply DC power to the DC link 4, and, as a result, the holding energy of the power storage device 14 gradually decreases.

When the servomotors for drive 3 are decelerated by the motor drive system 1 during time $t_3$ to time $t_5$, the servomotors for drive 3 perform regeneration and the total power consumption becomes negative. During time $t_3$ to time $t_4$, since the total power consumption is lower than the threshold for power storage, the power storage device control unit 17 controls the power storage device 14 to store DC power from the DC link 4. As a result, the holding energy of the power storage device 14 gradually increases.

When the servomotors for drive 3 are accelerated once again by the motor drive system 1 at time $t_5$, the total power consumption gradually increases. During time $t_5$ to time $t_6$, since DC power, into which AC power from the power source 2 is converted by the converter 11, is stored in the power storage device 14, the holding energy of the power storage device 14 gradually increases. When the total power consumption becomes higher than the threshold for supply at time $t_6$, since the power storage device control unit 17 controls the power storage device 14 to supply DC power to the DC link 4, the holding energy of the power storage device 14 gradually decreases. At time $t_7$, the holding energy of the power storage device 14 becomes lower than the threshold for energy shortage determination.

When the servomotors for drive 3 are decelerated by the motor drive system 1 at time $t_8$, the servomotors for drive 3 perform regeneration, and, since the total power consumption is lower than the threshold for power storage during time $t_8$ to time $t_9$, the power storage device control unit 17 controls the power storage device 14 to store DC power from the DC link 4. As a result, the holding energy of the power storage device 14 gradually increases. At time $t_{10}$, one cycle ends.

In one cycle from time $t_1$ to time $t_{10}$, the holding energy of the power storage device 14 takes a minimum value at time $t_8$. The base holding energy change unit 15 detects the minimum value of the holding energy in the one cycle, and compares the minimum value of the holding energy and the threshold for energy shortage determination. In the example of FIG. 6, the base holding energy change unit 15 determines that the minimum value of the holding energy of the power storage device 14 at time $t_8$ is lower than the threshold for energy shortage determination. The base holding energy change unit 15 calculates, as "energy shortage amount", a difference between the threshold for energy shortage determination and the minimum value of the holding energy of the power storage device 14 in the one cycle, and sets, as a new base holding energy, a value obtained by adding at least a value of the energy shortage amount or more to the present base holding energy. Since the minimum value of the holding energy becomes lower than the threshold for energy shortage determination, the base holding energy is changed to increase. Although the new base holding energy may be set at any time point after the time (time $t_8$) of detection of the minimum value of the holding energy of the power storage device 14, it is preferable that the new base holding energy is set as early as possible. In the example of FIG. 6, the new base holding energy is set before start time tio of the standby process period. The newly set base holding energy is greater than the previously set base holding energy by at least the energy shortage amount or more. From time $t_{10}$, a standby process begins for recovering the holding energy of the power storage device 14 up to the base holding energy. During the standby process period, DC power, into which AC power from the power source 2 is converted by the converter 11, is stored in the power storage device 14, and the holding energy of the power storage device 14 gradually increases. In a subsequent period including the standby process period, the power storage device 14 performs power storage, with the new base holding energy being set as a reference value (target value). Since the holding energy of the power storage device 14 recovers to the new base holding energy at time $t_{11}$, the standby process is terminated, and the next cycle is started at time $t_{12}$.

For example, in the cycle from time $t_{12}$ to time $t_{20}$, the holding energy of the power storage device 14 takes a minimum value at time $t_{18}$. Since each cycle has the same operation pattern, each cycle normally has substantially the same total power consumption. In other words, the total power consumption in the cycle from time $t_{12}$ to time $t_{20}$ is equal to the total power consumption in the cycle from time $t_1$ to time $t_{10}$. At least from time $t_{11}$, i.e. after the standby process period, since the power storage device 14 performs power storage, with the newly set "increased base holding energy" as the reference value (target value), even when the same total power consumption as in the cycle from time $t_1$ to time $t_{10}$ is consumed in the cycle from time $t_{12}$ to time $t_{20}$, no shortage of energy occurs. In other words, the minimum value of the holding energy of the power storage device 14 in the cycle from time $t_{12}$ to time $t_{20}$ does not become lower than the threshold for energy shortage determination. Also in the cycle from time $t_{12}$ to time $t_{20}$, the base holding energy change unit 15 detects the minimum value of the holding energy, and compares the minimum value of the holding energy and the threshold for energy shortage determination. The base holding energy change unit 15 determines, as a result of comparison, that the minimum value of the holding energy is not lower than the threshold for energy shortage determination, and, accordingly, the present base holding energy is not changed and is kept. In a further subsequent cycle, when the minimum value of the holding energy becomes lower than the threshold for energy shortage determination due to some factor, the base holding energy change unit 15 will calculate, as "energy shortage amount", a difference between the threshold for energy shortage determination and the minimum value of the holding energy of the power storage device 14, and will set, as a new base holding energy, a value obtained by adding at least a value of the energy shortage amount or more to the base holding energy at that time.

In conventional art to which the present embodiment is not applied, since the next operation cycle of the servomotors for drive starts at a time point when the holding energy of the power storage device has not recovered (increased) up to the base holding energy, the minimum value of the holding energy of the power storage device gradually decreases as the operation cycle of the servomotors for drive is repeated. The holding energy of the power storage device eventually becomes zero, the holding energy of the power storage device runs short, sufficient drive power is not supplied to the servomotors for drive, and a motor control system and a machine tool including the motor control system will accidentally make an alarm stop. By contrast, according to the present embodiment, when the minimum value of the holding energy becomes lower than the threshold for energy shortage determination, the base holding energy is increased by adding at least the energy shortage amount or more to the present base holding energy. Since the power storage device control unit 17 controls power storage of the power storage device 14 by setting the increased base holding energy as the target value, and the power storage device 14 performs power storage with the new base holding energy as the reference value (target value), the holding energy of the power storage device 14 can be kept at a proper amount, and energy shortage can be avoided.

A base holding energy change process by a second mode decreases the base holding energy when the holding energy of the power storage device 14 is excessive. According to the second mode, the base holding energy change unit 15 compares a maximum value of the holding energy of the power storage device 14 in a predetermined period and a threshold for excess energy determination defined in advance, and when the base holding energy change unit 15 determines, as a result of the comparison, that the maximum value of the holding energy of the power storage device 14 is higher than the threshold for excess energy determination, the base holding energy change unit 15 sets, as a new base holding energy after a change, a value calculated by subtracting a value, which is equal to or greater than a difference between the maximum value of the holding energy of the power storage device 14 and the threshold for excess energy determination, from the base holding energy before the change. A group of operations having the same details of the servomotors for drive 3 is defined as "one cycle", and the one cycle is defined as the above-described "predetermined period". Two or more cycles may be defined as the "predetermined period". The threshold for excess energy determination may be set to, for example a value less than the storage capacity of the power storage device 14. For instance, the threshold for excess energy determination is set to, for example about 90% of the maximum storage capacity of the power storage device 14. The numerical value mentioned here of the threshold for excess energy determination is merely an example, and the numerical value of the threshold for excess energy determination can be set to a optionally selected value in accordance with, for example the purpose of use to which the motor drive system is applied.

Figure 7:
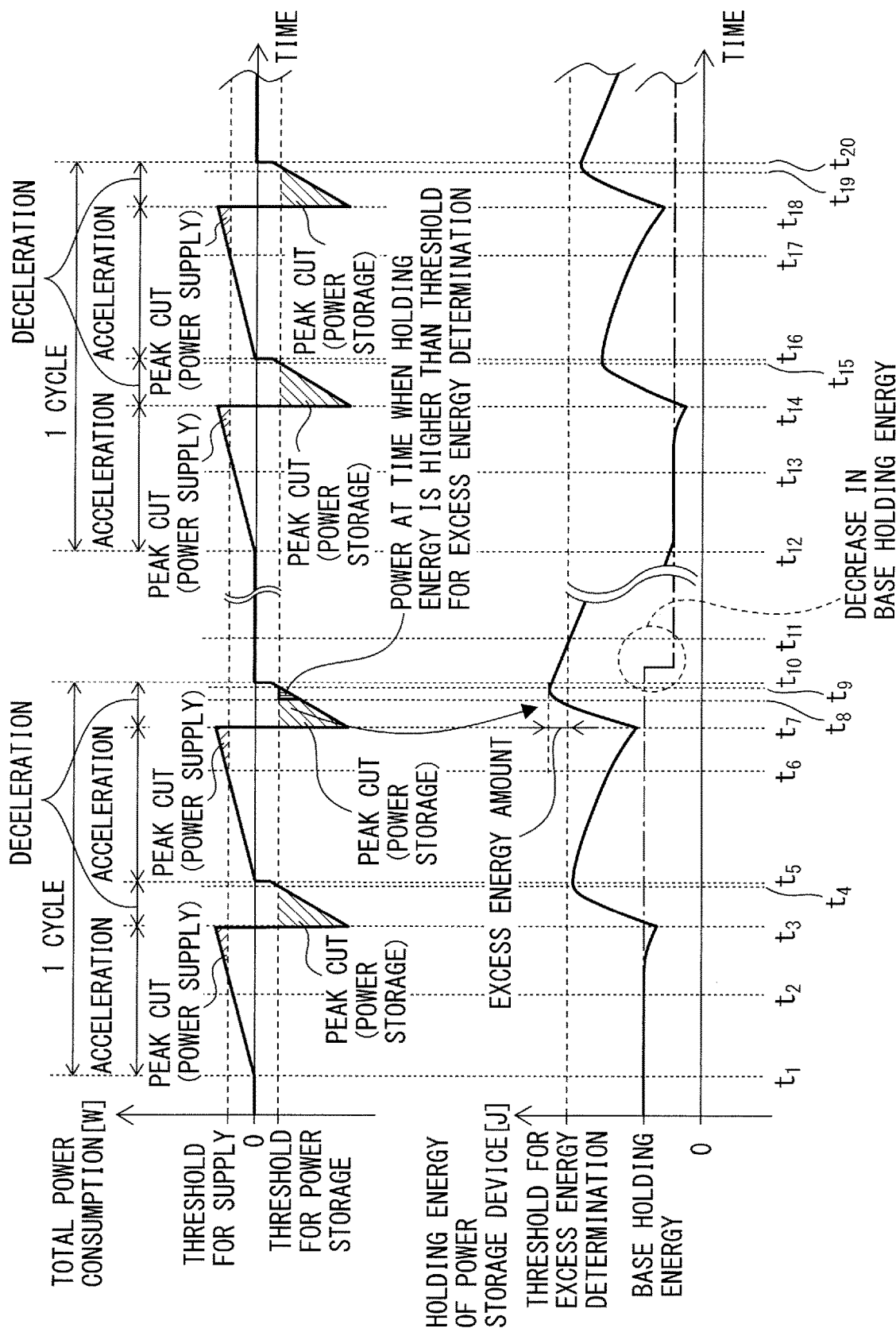
FIG. 7 is a timing chart illustrating an exemplary relationship between the total power consumption and the holding energy of the power storage device, when a base holding energy change process according to a second mode is executed in the motor drive system according to the embodiment.

FIG. 7 is a timing chart illustrating an exemplary relationship between the total power consumption and the holding energy of the power storage device, when the base holding energy change process according to the second mode is executed in the motor drive system according to the embodiment. In FIG. 7, an upper part indicates a total power consumption calculated by the power consumption calculation unit 16, and a lower part indicates the holding energy of the power storage device 14. An example is now assumed in which the holding energy of the power storage device 14 is excessive during time $t_8$ to time $t_{10}$, when the servomotors for drive 3 are accelerated and decelerated by the motor drive system 1 and the total power consumption varies as illustrated in the upper part of FIG. 7. The "acceleration, deceleration, acceleration, deceleration" of the servomotors for drive 3 is defined as one cycle. In FIG. 7, for example, the "acceleration, deceleration, acceleration, deceleration" from time $t_1$ to time $t_{10}$ is one cycle, and the "acceleration, deceleration, acceleration, deceleration" from time $t_{12}$ to time $t_{20}$ is one cycle. Since each cycle has the same operation pattern, each cycle normally has substantially the same total power consumption. A standby process period for recovering the holding energy of the power storage device 14 to the base holding energy is provided between a preceding cycle and a subsequent cycle. In the standby process period, the converter 11 converts DC power, which is supplied (discharged) to the DC link 4 from the power storage device 14, into AC power and feeds the AC power back to the power source 2, and the holding energy of the power storage device 14 gradually decreases. In the example of FIG. 7, the standby process period ends at time $t_{11}$ since the holding energy of the power storage device 14 recovers (decreases) to the base holding energy, and the next cycle is started at time $t_{12}$. Although the operation of the servomotor for drive 3 in one cycle is defined as "acceleration, deceleration, acceleration, deceleration" by way of example, one cycle may be defined with inclusion of constant-speed rotation, a stop, or the like.

Until time $t_1$, the holding energy of the power storage device 14 is kept at the base holding energy. During time $t_1$ to time $t_3$, when the servomotors for drive 3 are accelerated by the motor drive system 1, the total power consumption gradually increases. When the total power consumption becomes higher than the threshold for supply at time $t_2$, the power storage device control unit 17 controls the power storage device 14 to supply DC power to the DC link 4. As a result, the holding energy of the power storage device 14 gradually decreases.

When the servomotors for drive 3 are decelerated by the motor drive system 1 during time $t_3$ to time $t_5$, the servomotors for drive 3 perform regeneration and the total power consumption becomes negative. During time $t_3$ to time $t_4$, since the total power consumption is lower than the threshold for power storage, the power storage device control unit 17 controls the power storage device 14 to store DC power from the DC link 4. As a result, the holding energy of the power storage device 14 gradually increases.

When the servomotors for drive 3 are accelerated once again by the motor drive system 1 at time $t_5$, the total power consumption gradually increases. When the total power consumption becomes higher than the threshold for supply at time $t_6$, since the power storage device control unit 17 controls the power storage device 14 to supply DC power to the DC link 4, the holding energy of the power storage device 14 further decreases with the present base holding energy as the target value.

When the servomotors for drive 3 are decelerated by the motor drive system 1 at time $t_7$, the servomotors for drive 3 perform regeneration. Since the total power consumption is lower than the threshold for power storage during time $t_7$ to time $t_9$, the power storage device control unit 17 controls the power storage device 14 to store DC power from the DC link 4. As a result, the holding energy of the power storage device 14 gradually increases. At time $t_8$, the holding energy of the power storage device 14 becomes higher than the threshold for excess energy determination.

When the servomotors for drive 3 are stopped by the motor drive system 1 at time $t_{10}$ and the one cycle ends, the total power consumption becomes zero. Since the servomotors for drive 3 does not perform regeneration, the holding energy of the power storage device 4 decreases. At time $t_{10}$, one cycle ends.

In one cycle from time $t_1$ to time $t_{10}$, the holding energy of the power storage device 14 takes a maximum value at time $t_9$. The base holding energy change unit 15 detects the maximum value of the holding energy in the one cycle, and compares the maximum value of the holding energy and the threshold for excess energy determination. In the example of FIG. 7, the base holding energy change unit 15 determines that the maximum value of the holding energy of the power storage device 14 at time $t_9$ is higher than the threshold for excess energy determination. The base holding energy change unit 15 calculates, as "excess energy amount", a difference between the maximum value of the holding energy of the power storage device 14 in the one cycle and the threshold for excess energy determination, and sets, as a new base holding energy, a value obtained by subtracting at least a value of the excess energy amount or more from the present base holding energy. Since the maximum value of the holding energy becomes higher than the threshold for excess energy determination, the base holding energy is changed to decrease. Although the new base holding energy may be set at any time point after the time (time $t_9$) of detection of the maximum value of the holding energy of the power storage device 14, it is preferable that the new base holding energy is set as early as possible. In the example of FIG. 7, the new base holding energy is set after start time $t_{10}$ of the standby process period. The newly set base holding energy is less than the previously set base holding energy by at least the excess energy amount or more. From time $t_{10}$, a standby process begins for recovering (decreasing) the holding energy of the power storage device 14 to the base holding energy. During the standby process period, the converter 11 converts DC power, which is supplied (discharged) to the DC link 4 from the power storage device 14, into AC power and feeds the AC power back to the power source 2, and the holding energy of the power storage device 14 gradually decreases. In a subsequent period including the standby process period, the power storage device 14 performs power storage, with the new base holding energy being set as a reference value (target value). Since the holding energy of the power storage device 14 recovers (decreases) to the new base holding energy at time $t_{11}$, the standby process is terminated, and the next cycle is started at time $t_{12}$.

For example, in the cycle from time $t_{12}$ to time $t_{20}$, the holding energy of the power storage device 14 takes a maximum value at time $t_{20}$. Since each cycle has the same operation pattern, each cycle normally has substantially the same total power consumption. In other words, the total power consumption in the cycle from time $t_{12}$ to time $t_{20}$ is equal to the total power consumption in the cycle from time $t_1$ to time $t_{10}$. At least from time $t_{11}$, i.e. after the standby process period, since the power storage device 14 performs power storage, with the newly set "decreased base holding energy" as the reference value (target value), even when the same total power consumption as in the cycle from time $t_1$ to time $t_{10}$ is consumed in the cycle from time $t_{12}$ to time $t_{20}$, no excess of energy occurs. In other words, the maximum value of the holding energy of the power storage device 14 in the cycle from time $t_{12}$ to time $t_{20}$ does not become higher than the threshold for excess energy determination. Also in the cycle from time $t_{12}$ to time $t_{20}$, the base holding energy change unit 15 detects the maximum value of the holding energy in this cycle, and compares the maximum value of the holding energy and the threshold for excess energy determination. The base holding energy change unit 15 determines, as a result of the comparison, that the maximum value of the holding energy is not higher than the threshold for excess energy determination, and, accordingly, the present base holding energy is not changed and is kept. In a further subsequent cycle, when the maximum value of the holding energy becomes higher than the threshold for excess energy determination due to some factor, the base holding energy change unit 15 will calculate, as "excess energy amount", a difference between the maximum value of the holding energy of the power storage device 14 and the threshold for excess energy determination, and will set, as a new base holding energy, a value obtained by subtracting at least a value of the excess energy amount or more from the present base holding energy.

In conventional art to which the present embodiment is not applied, since the next operation cycle of the servomotors for drive starts at a time point when the holding energy of the power storage device has not recovered (decreased) to the base holding energy, the maximum value of the holding energy of the power storage device gradually increases as the operation cycle of the servomotors for drive is repeated. As a result, the load on the power storage device increases, and eventually the power storage device is destroyed. By contrast, according to the present embodiment, when the maximum value of the holding energy becomes higher than the threshold for excess energy determination, the base holding energy is decreased by subtracting at least the excess energy amount or more from the present base holding energy. Since the power storage device control unit 17 controls power storage of the power storage device 14 for the next cycle onwards by setting the decreased base holding energy as the target value, and the power storage device 14 performs power storage so that the holding energy restores to the new base holding energy, the holding energy of the power storage device 14 can be kept at a proper amount, and excess energy can be avoided.

A base holding energy change process by a third mode decreases the base holding energy when the holding energy of the power storage device 14 has an allowance. According to the third mode, the base holding energy change unit 15 compares a minimum value of the holding energy of the power storage device 14 in a predetermined period and a threshold for energy allowance determination defined in advance, and when the base holding energy change unit 15 determines, as a result of the comparison, that the minimum value of the holding energy of the power storage device 14 is higher than the threshold for energy allowance determination, the base holding energy change unit 15 sets, as a new base holding energy after a change, a value calculated by subtracting a value, which is equal to or less than a difference between the minimum value of the holding energy of the power storage device 14 and the threshold for energy allowance determination, from the base holding energy before the change. A group of operations having the same details of the servomotors for drive 3 is defined as "one cycle", and the one cycle is defined as the above-described "predetermined period". Two or more cycles may be defined as the "predetermined period". The threshold for energy allowance determination may be set to, for example a value greater than the zero, but needs to be set to a value greater than the threshold for energy shortage determination. For instance, the threshold for energy allowance determination is set to, for example about 20% of the maximum storage capacity of the power storage device 14. The numerical value mentioned here of the threshold for energy allowance determination is merely an example, and the numerical value of the threshold for energy allowance determination can be set to a optionally selected value in accordance with, for example the purpose of use to which the motor drive system is applied, but needs to be set to a value greater than the numerical value (for example 10%) which is set for the threshold for energy shortage determination.

Figure 8:
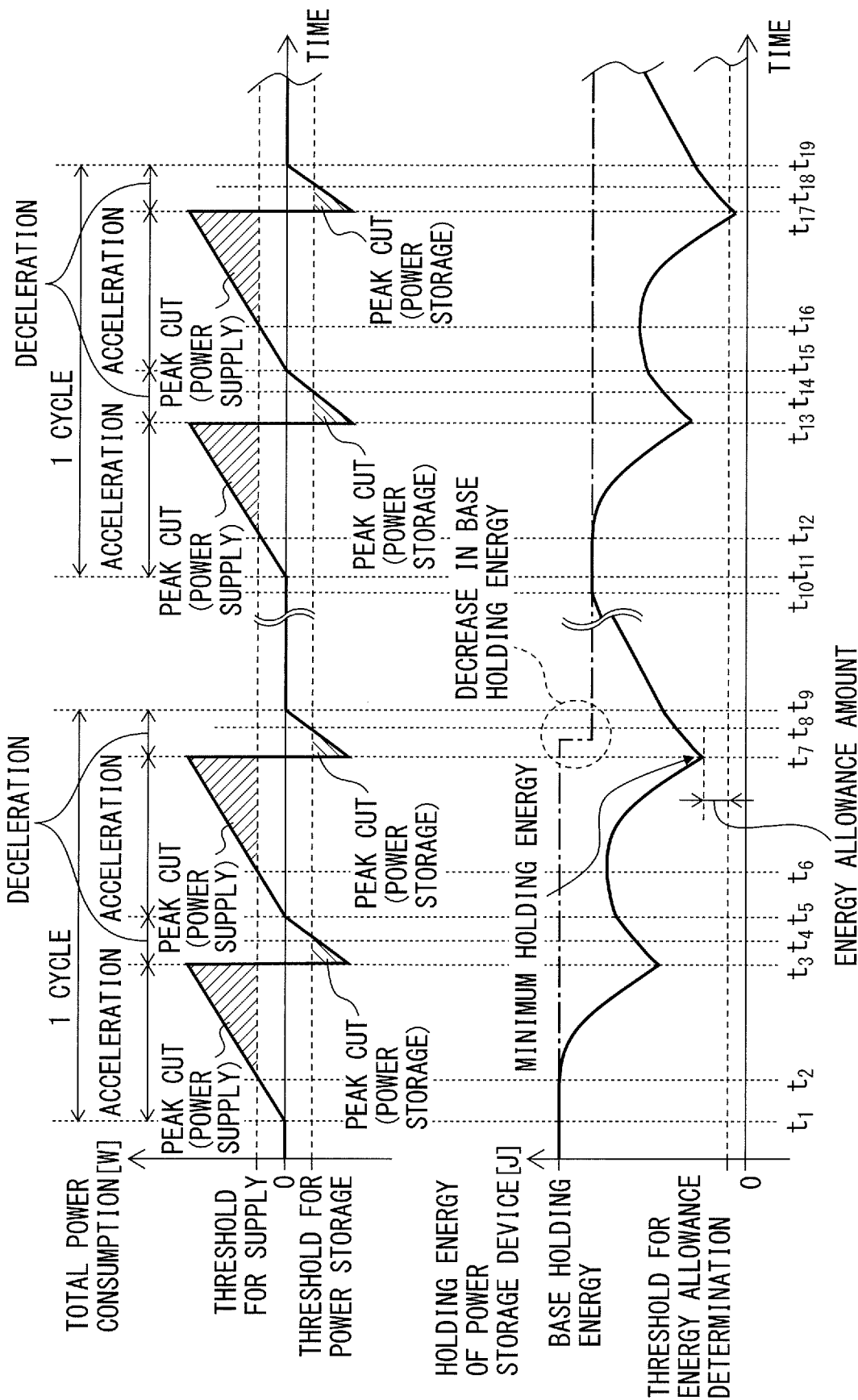
FIG. 8 is a timing chart illustrating an exemplary relationship between the total power consumption and the holding energy of the power storage device, when a base holding energy change process according to a third mode is executed in the motor drive system according to the embodiment.

FIG. 8 is a timing chart illustrating an exemplary relationship between the total power consumption and the holding energy of the power storage device, when the base holding energy change process according to the third mode is executed in the motor drive system according to the embodiment. In FIG. 8, an upper part indicates a total power consumption calculated by the power consumption calculation unit 16, and a lower part indicates the holding energy of the power storage device 14. An example is now assumed in which the holding energy of the power storage device 14 takes a minimum value at time t7, when the servomotors for drive 3 are accelerated and decelerated by the motor drive system 1 and the total power consumption varies as illustrated in the upper part of FIG. 8. The "acceleration, deceleration, acceleration, deceleration" of the servomotors for drive 3 is defined as one cycle. In FIG. 8, for example, the "acceleration, deceleration, acceleration, deceleration" from time $t_1$ to time $t_9$ is one cycle, and the "acceleration, deceleration, acceleration, deceleration" from time $t_{11}$ to time $t_{19}$ is one cycle. Since each cycle has the same operation pattern, each cycle normally has substantially the same total power consumption. A standby process period for recovering the holding energy of the power storage device 14 to the base holding energy is provided between a preceding cycle and a subsequent cycle. In the standby process period, DC power, into which AC power from the power source 2 is converted by the converter 11, is stored in the power storage device 14, and the holding energy of the power storage device 14 gradually increases. In the example of FIG. 8, the standby process period ends at time $t_{10}$ since the holding energy of the power storage device 14 recovers to the base holding energy, and the next cycle is started at time $t_{11}$. Although the operation of the servomotor for drive 3 in one cycle is defined as "acceleration, deceleration, acceleration, deceleration" by way of example, one cycle may be defined with inclusion of constant-speed rotation, a stop, or the like.

Until time $t_1$, the holding energy of the power storage device 14 is kept at the base holding energy. During time $t_1$ to time $t_3$, when the servomotors for drive 3 are accelerated by the motor drive system 1, the total power consumption gradually increases. When the total power consumption becomes higher than the threshold for supply at time $t_2$, the power storage device control unit 17 controls the power storage device 14 to supply DC power to the DC link 4. As a result, the holding energy of the power storage device 14 gradually decreases.

When the servomotors for drive 3 are decelerated by the motor drive system 1 during time $t_3$ to time $t_5$, the servomotors for drive 3 perform regeneration and the total power consumption becomes negative. During time $t_3$ to time $t_4$, since the total power consumption is lower than the threshold for power storage, the power storage device control unit 17 controls the power storage device 14 to store DC power from the DC link 4. As a result, the holding energy of the power storage device 14 gradually increases.

When the servomotors for drive 3 are accelerated once again by the motor drive system 1 during time $t_5$ to time $t_7$, the total power consumption gradually increases. Also during time $t_4$ to time $t_6$, since DC power, into which AC power from the power source 2 is converted by the converter 11, is stored in the power storage device 14, the holding energy of the power storage device 14 gradually increases. When the total power consumption becomes higher than the threshold for supply at time $t_6$, the power storage device control unit 17 controls the power storage device 14 to supply DC power to the DC link 4, and, as a result, the holding energy of the power storage device 14 gradually decreases.

When the deceleration of the servomotors for drive 3 is started by the motor drive system 1 at time $t_7$, the servomotors for drive 3 perform regeneration. Since the total power consumption is lower than the threshold for power storage during time $t_7$ to time $t_8$, the power storage device control unit 17 controls the power storage device 14 to store DC power from the DC link 4. As a result, the holding energy of the power storage device 14 gradually increases. At time $t_9$, one cycle ends.

In one cycle from time $t_1$ to time $t_9$, the holding energy of the power storage device 14 takes a minimum value at time $t_7$. The base holding energy change unit 15 detects the minimum value of the holding energy in the one cycle, and compares the minimum value of the holding energy and the threshold for energy allowance determination. The base holding energy change unit 15 determines that the minimum value of the holding energy of the power storage device 14 is higher than the threshold for energy allowance determination. The base holding energy change unit 15 calculates, as "energy allowance amount", a difference between the minimum value of the holding energy of the power storage device 14 in the one cycle and the threshold for energy allowance determination, and sets, as a new base holding energy, a value obtained by subtracting at least a value of the energy allowance amount or more from the present base holding energy. Since the minimum value of the holding energy did not become lower than the threshold for energy allowance determination, the base holding energy is changed to decrease. Although the new base holding energy may be set at any time point from the time (time $t_7$) of detection of the minimum value of the holding energy of the power storage device 14, it is preferable that the new base holding energy is set as early as possible. In the example of FIG. 8, the new base holding energy is set before start time $t_9$ of the standby process period. The newly set base holding energy is less than the previously set base holding energy by at least the energy allowance amount or more. From time $t_9$, a standby process begins for recovering the holding energy of the power storage device 14 to the base holding energy. During the standby process period, DC power, into which AC power from the power source 2 is converted by the converter 11, is stored in the power storage device 14, and the holding energy of the power storage device 14 gradually increases. In a subsequent period including the standby process period, the power storage device 14 performs power storage, with the new base holding energy being set as a reference value (target value). Since the holding energy of the power storage device 14 recovers to the new base holding energy at time $t_{10}$, the standby process is terminated, and the next cycle is started at time $t_{11}$.

For example, in the cycle from time $t_{11}$ to time $t_{19}$, the holding energy of the power storage device 14 takes a minimum value at time $t_{17}$. Since each cycle has the same operation pattern, each cycle normally has substantially the same total power consumption. In other words, the total power consumption in the cycle from time $t_{11}$ to time $t_{19}$ is equal to the total power consumption in the cycle from time $t_1$ to time $t_9$. At least from time $t_9$, i.e. after the standby process period, since the power storage device 14 performs power storage, with the newly set "decreased base holding energy" as the reference value (target value), the power storage device 14 performs power storage so that the holding energy restores to the new base holding energy, and, therefore, the load on the power storage device 14 is reduced and the holding energy of the power storage device 14 can be kept at a proper amount. In order to prevent the occurrence of energy shortage in the next cycle onwards due to the execution of the base holding energy change process according to the third mode, the threshold for energy allowance determination, which is used in the base holding energy change process according to the third mode, needs to be set to a value higher than the threshold for energy shortage determination, which is used in the base holding energy change process according to the first mode.

The base holding energy change processes according to the above first mode, second mode and third mode may be executed independently as the base holding energy change process in the motor drive system 1 according to the present embodiment, or may be executed in combination.

Figure 9:
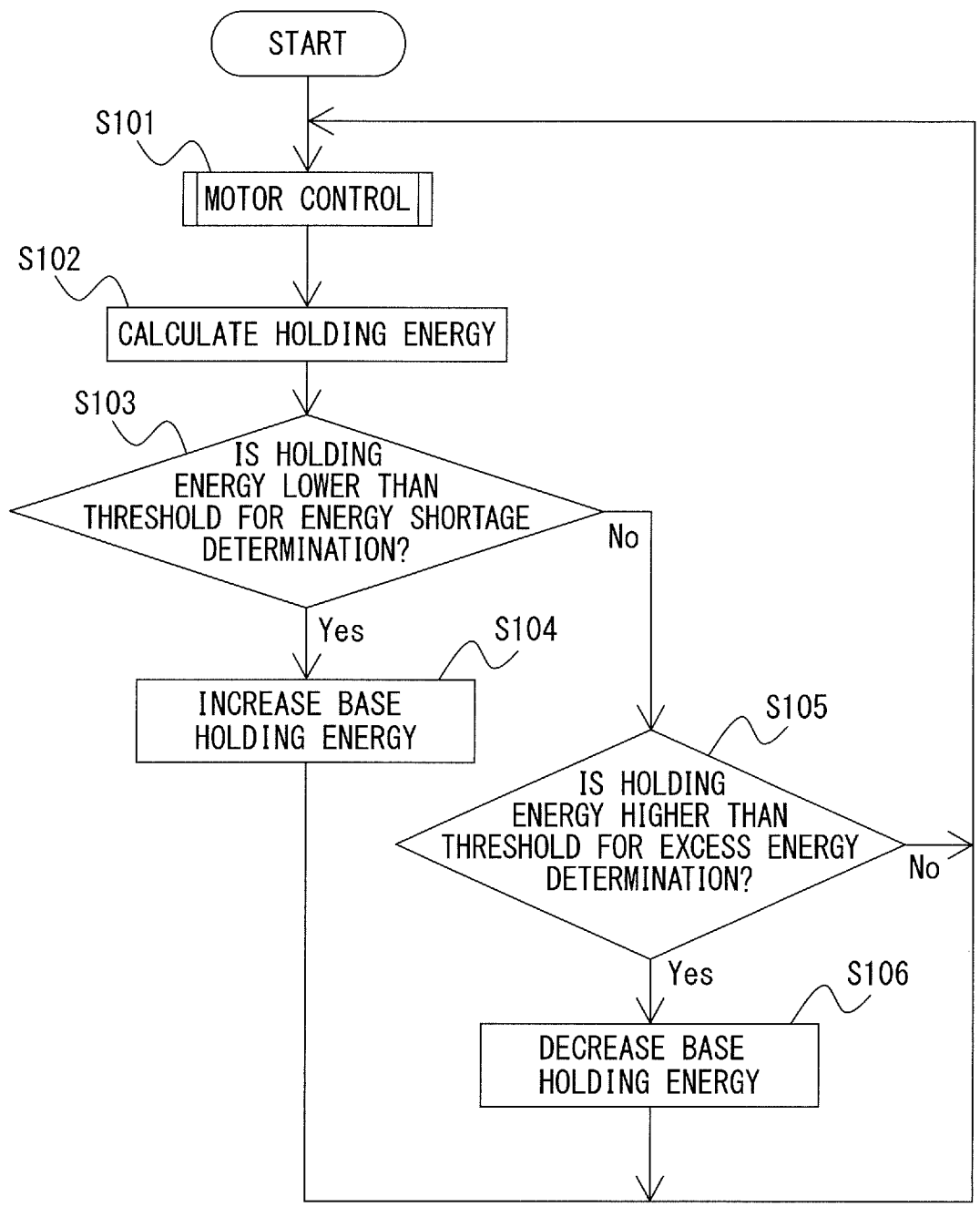
FIG. 9 is a flowchart illustrating an operation sequence of the motor drive system according to the embodiment.

Next, an operation sequence of the motor drive system 1 will be described. FIG. 9 is a flowchart illustrating the operation sequence of the motor drive system according to the embodiment. A description is given of an example in which the base holding energy change processes by the first mode and second mode are executed.

The motor control unit for drive 13 controls the servomotors for drive 3 such that the servomotors for drive 3 operate in accordance with a predetermined operation pattern (S101). During this time, using the calculation result of the power consumption calculation unit 16, the power storage device control unit 17 controls power storage and power supply of the power storage device 14.

In step S102, the base holding energy change unit 15 calculates the holding energy of the power storage device 14. As described above, the calculation process of the holding energy of the power storage device 14 may be executed by the power storage device control unit 17 or the calculation process unit which is separately provided.

In step S103, the base holding energy change unit 15 compares the minimum value of the holding energy of the power storage device 14 in the predetermined period and the threshold for energy shortage determination defined in advance, and determines whether the minimum value of the holding energy of the power storage device 14 is lower than the threshold for energy shortage determination. As a result of the comparison, when it is determined that the minimum value of the holding energy is lower than the threshold for energy shortage determination, the operation sequence advances to step S104. When it is determined that the minimum value of the holding energy is not lower than the threshold for energy shortage determination, the operation sequence advances to step S105.

In step S104, the base holding energy change unit 15 sets, as a new base holding energy, a value obtained by adding at least a value, which is equal to or greater than the difference between the threshold for energy shortage determination and the minimum value of the holding energy of the power storage device 14, to the base holding energy. Then, the operation sequence returns to step S101.

In step S105, the base holding energy change unit 15 compares the maximum value of the holding energy of the power storage device 14 in the predetermined period and the threshold for excel energy determination defined in advance, and determines whether the maximum value of the holding energy of the power storage device 14 is higher than the threshold for excess energy determination. As a result of the comparison, when it is determined that the maximum value of the holding energy is higher than the threshold for excess energy determination, the operation sequence advances to step S106. When it is determined that the maximum value of the holding energy is not higher than the threshold for excess energy determination, the operation sequence returns to step S101.

In step S106, the base holding energy change unit 15 sets, as a new base holding energy after, a value calculated by subtracting a value, which is equal to or greater than a difference between the maximum value of the holding energy of the power storage device 14 and the threshold for excess energy determination, from the base holding energy. Then, the operation sequence returns to step S101.

Although illustration is omitted, before executing step S103, the base holding energy change unit 15 determines whether a predetermined time has passed or not, and, when the predetermined time has passed, the operation sequence advances to step S103. The base holding energy change process of step S103 and step S104 by the first mode and the base holding energy change process of step S105 and step S106 by the second mode may be executed in a reverse order, and, in this case, the base holding energy change unit 15 determines, before executing step S105, whether a predetermined time has passed or not, and, when the predetermined time has passed, the operation sequence advances to step S105. In addition, the process of step S103 and step S105 may be executed prior to both step S104 and step S106.

Figure 10:
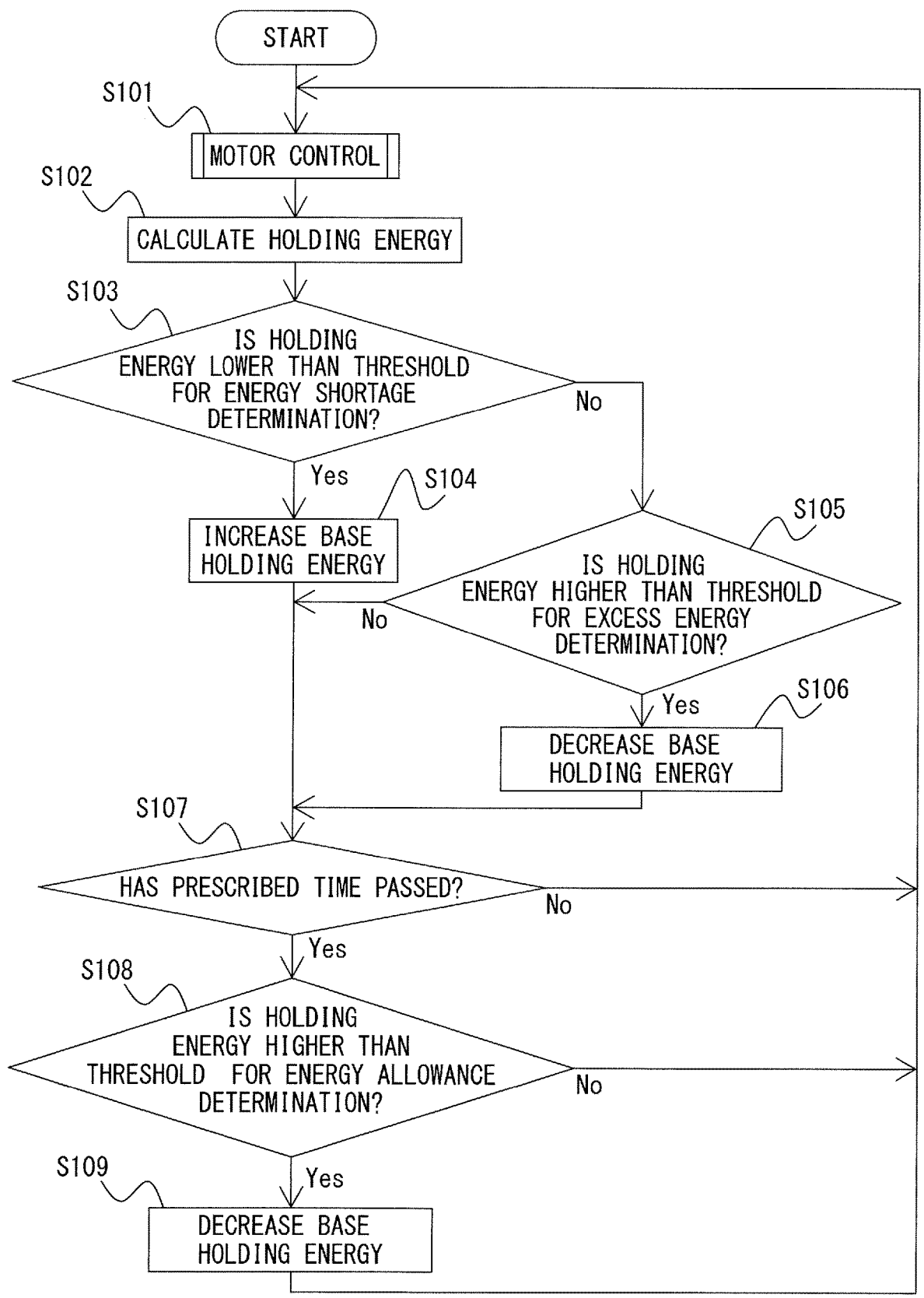
FIG. 10 is a flowchart illustrating an operation sequence of the motor drive system according to the embodiment.

FIG. 10 is a flowchart illustrating another operation sequence of the motor drive system according to the embodiment. In FIG. 10, the base holding energy change process according to the third mode is further executed in the example described with reference to FIG. 9, in which the base holding energy change processes according to the first mode and second mode are executed. In FIG. 10, the process of step S101 to S106 is as described with reference to FIG. 9.

In step S107, the base holding energy change unit 15 determines whether a predetermined time has passed or not. When the predetermined time has passed, the operation sequence advances to step S108.

In step S108, the base holding energy change unit 15 compares the minimum value of the holding energy of the power storage device 14 in the predetermined period and the threshold for energy allowance determination defined in advance, and determines whether the minimum value of the holding energy of the power storage device 14 is higher than the threshold for energy allowance determination. As a result of the comparison, when the base holding energy change unit 15 determines that the minimum value of the holding energy is higher than the threshold for energy allowance determination, the operation sequence advances to step S109, and, when the base holding energy change unit 15 does not determine that the minimum value of the holding energy is higher than the threshold for energy allowance determination, the operation sequence returns to step S101.

In step S108, the base holding energy change unit 15 calculates, as the new base holding energy, a value, which is equal to or less than the difference between the minimum value of the holding energy of the power storage device 14 and the threshold for energy allowance determination, from the base holding energy.

The base holding energy change process of step S103 and step S104 by the first mode, the base holding energy change process of step S105 and step S106 by the second mode, and the base holding energy change process of step S107 and step S108 by the third mode may be executed in a changed order.

The base holding energy change processes according to the first mode and second mode were described with reference to FIG. 9 and the base holding energy change processes according to the first mode, second mode and third mode were described with reference to FIG. 10, but, as described above, the base holding energy change processes according to the first mode, second mode and third mode may be executed independently as the base holding energy change process in the motor drive system 1 according to the present embodiment. Further, the base holding energy change processes according to the first mode and the third mode may be executed in combination, or the base holding energy change processes according to the second mode and the third mode may be executed in combination.

The above-described motor control unit for drive 13, base holding energy change unit 15, power consumption calculation unit 16 and power storage device control unit 17 may be constituted by, for example, a software program form, or may be constituted by a combination of various electronic circuits and software programs. In this case, for example, an arithmetic processing device, such as a CPU or an MPUDSP, may be caused to execute the software programs to realize the functions of the respective components. Alternatively, the motor control unit for drive 13, base holding energy change unit 15, power consumption calculation unit 16 and power storage device control unit 17 may be realized by a semiconductor integrated circuit in which software programs for realizing the functions of the motor control unit for drive 13, base holding energy change unit 15, power consumption calculation unit 16 and power storage device control unit 17 are stored.

The motor control unit for drive 13, base holding energy change unit 15, power consumption calculation unit 16 and power storage device control unit 17 are provided, for example, in a main control device (not illustrated) in the motor drive system 1. For example, when the motor drive system 1 is configured to control the driving of the servomotors for drive 3 provided in a machine tool, the motor control unit for drive 13, base holding energy change unit 15, power consumption calculation unit 16 and power storage device control unit 17 may be provided in a numerical control device in the machine tool. When the motor control unit for drive 13, base holding energy change unit 15, power consumption calculation unit 16 and power storage device control unit 17 are constituted in the software program form, an arithmetic processing unit in the numerical control device may be caused to execute the software program, and thereby the functions of the respective components can be realized.

According to the embodiment of the present disclosure, in the motor drive system including the power storage device that is provided in order to reduce the power peak of the power source equipment, the energy stored in the power storage device can be kept at the proper amount.

The invention claimed is:

1. A motor drive system comprising:
a converter configured to convert power between AC power in a power source and DC power in a DC link;
an inverter for drive configured to convert power between the DC power in the DC link and AC power serving as drive power or regenerative power for a servomotor for drive;
a motor control unit for drive configured to control the servomotor for drive connected to the inverter for drive;
a power storage device configured to store the DC power from the DC link or to supply the DC power to the DC link;
a power storage device control unit configured to control the power storage device to store DC power from the DC link such that a holding energy of the power storage device restores to a base holding energy, the base holding energy is a constant target energy level for the power storage device to obtain when the motor control unit does not control the servomotor for drive; and
a base holding energy change unit configured to:
increase the base holding energy in response to the holding energy of the power storage device previously decreasing below a threshold for energy shortage determination, by adding a first value, which is equal to or greater than a first amount that the holding energy of the power storage device previously decreased below the threshold for energy shortage determination, and
decrease the base holding energy in response to the holding energy of the power storage device previously increasing above a threshold for energy excess determination by subtracting a second value, which is equal to or greater than a second amount that the holding energy of the power storage device previously increased above the threshold for energy shortage determination,
wherein the threshold for energy shortage determination and the threshold for energy excess determination do not change in response to the increase or the decrease in the base holding energy.

2. The motor drive system according to claim 1, further comprising:
a power consumption calculation unit configured to calculate a total power consumption which is calculated as a sum of an output of the servomotor for drive, a winding loss in the servomotor for drive, a loss in the converter, and a loss in the inverter for drive, and
wherein the power storage device control unit is further configured to:
compare the total power consumption to one of a threshold for supply defined in advance and a threshold for power storage defined in advance,
control, when the comparison indicates that the total power consumption is higher than the threshold for supply, the power storage device to supply DC power to the DC link, and
control, when the comparison indicates that the total power consumption is lower than the threshold for power storage, the power storage device to store DC power from the DC link such that the holding energy of the power storage device restores to the base holding energy.

3. The motor drive system according to claim 1, wherein the base holding energy change unit is configured to compare a minimum value of the holding energy of the power storage device in a predetermined period and a threshold for energy shortage determination defined in advance, and when the base holding energy change unit determines, as a result of the comparison, that the minimum value of the holding energy of the power storage device is lower than the threshold for energy shortage determination, the base holding energy change unit is configured to set, as a new base holding energy, a value calculated by adding a value, which is equal to or greater than a difference between the threshold for energy shortage determination and the minimum value of the holding energy of the power storage device, to the base holding energy.

4. The motor drive system according to claim 1, wherein the base holding energy change unit is configured to compare a maximum value of the holding energy of the power storage device in a predetermined period and a threshold for excess energy determination defined in advance, and when the base holding energy change unit determines, as a result of the comparison, that the maximum value of the holding energy of the power storage device is higher than the threshold for excess energy determination, the base holding energy change unit is configured to set, as a new base holding energy, a value calculated by subtracting a value, which is equal to or greater than a difference between the maximum value of the holding energy of the power storage device and the threshold for excess energy determination, from the base holding energy.

5. The motor drive system according to claim 1, wherein the base holding energy change unit compares a minimum value of the holding energy of the power storage device in a predetermined period and a threshold for energy allowance determination defined in advance, and when the base holding energy change unit determines, as a result of the comparison, that the minimum value of the holding energy of the power storage device is higher than the threshold for energy allowance determination, the base holding energy change unit is configured to set, as a new base holding energy, a value calculated by subtracting a value, which is equal to or less than a difference between the minimum value of the holding energy of the power storage device and the threshold for energy allowance determination, from the base holding energy.

6. The motor drive system according to claim 1, wherein the power storage device comprises:
   a flywheel configured to store rotation energy;
   a servomotor for buffer comprising a rotation shaft coupled to the flywheel; and
   an inverter for buffer configured to convert power between the DC power in the DC link and AC power serving as drive power or regenerative power for the servomotor for buffer.

7. The motor drive system according to claim 1, wherein the power storage device comprises:
   a capacitor; and
   a DC/DC converter configured to convert power between the DC power in the DC link and DC power stored in the capacitor.

* * * * *